(12) United States Patent
Braig et al.

(10) Patent No.: US 7,363,272 B1
(45) Date of Patent: *Apr. 22, 2008

(54) TRADING SYSTEM AND METHOD FOR INSTITUTIONAL ATHLETIC AND EDUCATION PROGRAMS

(76) Inventors: Kevin P. Braig, 9055 O'Connor's Point Rd., Belle Center, OH (US) 43310; John D. Reed, 525 Ridgewood Ave., Dayton, OH (US) 45409

(*) Notice: Subject to any disclaimer, the term of this patent is extended or adjusted under 35 U.S.C. 154(b) by 0 days.

This patent is subject to a terminal disclaimer.

(21) Appl. No.: 11/754,797

(22) Filed: May 29, 2007

Related U.S. Application Data

(60) Provisional application No. 60/810,891, filed on Jun. 5, 2006.

(51) Int. Cl.
*G06Q 40/00* (2006.01)
(52) U.S. Cl. .................................................. 705/37
(58) Field of Classification Search ............... 705/37, 705/35
See application file for complete search history.

(56) References Cited

U.S. PATENT DOCUMENTS

| | | | |
|---|---|---|---|
| 6,321,212 B1 | 11/2001 | Lange | |
| 6,390,472 B1 | 5/2002 | Vinarsky | |
| 7,020,632 B1 | 3/2006 | Kohls et al. | |
| 7,206,755 B1* | 4/2007 | Muralidhar | 705/26 |
| 2003/0009415 A1* | 1/2003 | Lutnick et al. | 705/37 |
| 2005/0144118 A1 | 6/2005 | Dev et al. | |
| 2005/0228738 A1* | 10/2005 | Harris | 705/37 |
| 2007/0022029 A1 | 1/2007 | Ma et al. | |

OTHER PUBLICATIONS

Angrist W. Stanley, "Iowa Market Takes Stock of Presidential Candidates", Wall Street Journal, pp. 1-2, Aug. 1995.*
Moret Jim, "Online 'stock exchange' lets you trade in Hollywood glitz", CNN, web posted, pp. 1-2, May 1997.*
Romer, Paul M.; Endogenous Technological Change; Journal of Political Economy; 1990; p. S71-S102; vol. 98, No. 5, pt 2.
Ozgit, Alper; Performance Based Sports Derivatives: A New Instrument; 2006; p. 83-121.
Arrow, Kenneth J.; The Theory of Risk-Bearing: Small and Great Risks; Journal Of Risk And Uncertainty; 1996; 12: 103-111; Kluwer Academic Publishers.

* cited by examiner

*Primary Examiner*—Hani M. Kazimi

(57) ABSTRACT

A device and method for trading commodity options and futures related to an educational institution's non-rival athletic program to manage risks associated with producing collegiate athletic programs. In one version, the underlying asset of the options and futures contracts is an athletic prospect's obligation to participate in a non-rival athletic program at a particular institution in exchange for the opportunity for the athletic prospect to participate in academic and athletic programs within the institution. In a particular form, the underlying asset is a signed National Letter of Intent, a contract that obligates a prospect attending a particular institution to participate in that institution's non-rival athletic program. Revenues generated by options and futures contracts traded according to the device and method of the present invention can be used to further the institution's educational and athletic missions.

19 Claims, 8 Drawing Sheets

460

SYMBIOTIC SPORTS   LOG OUT

SYMohiostate Futures Contracts

INPUT THE FOLLOWING DESIRED QUANTITIES: — 4602

NUMBER OF CONTRACTS: [ 500 ]

PRICE PER CONTRACT: [ 52.90 ] — 4604

— 4606

THEN CLICK ON THE SUBMIT BUTTON: SUBMIT

SYMBIOTIC SPORTS   LOG OUT

SYMohiostate Futures Contracts

VERIFY THE FOLLOWING ARE CORRECT: — 4702

NUMBER OF CONTRACTS: [ 500 ]   4704

PRICE PER CONTRACT: [ 52.90 ]   4706 A, B

IF CORRECT, THEN PLEASE CLICK *HERE*;

IF INCORRECT, THEN PLEASE CLICK *HERE*

FIG. 3H

TRADING SYSTEM AND METHOD FOR INSTITUTIONAL ATHLETIC AND EDUCATION PROGRAMS

This application claims the benefit of the filing date of U.S. Provisional Application No. 60/810,891, filed Jun. 5, 2006. This application is related to a U.S. application Ser. No. 11/754,797, also entitled TRADING SYSTEM AND METHOD FOR INSTITUTIONAL ATHLETIC AND EDUCATION PROGRAMS, filed on May 29, 2007.

BACKGROUND OF THE INVENTION

The present invention relates generally to trading novel commodity options and futures contracts, and more particularly to a device and method for trading such contracts as they relate to athletic and education programs.

Education, particularly higher education, is the gateway to the American Dream. The long-term economic value of earning a college degree is well-documented. College-educated workers, on average, can bring home more than $1 million more over a lifetime than people who end their formal education after high school.

Though benefits of a post-secondary degree are undeniable, consumers of higher education (students and families) have to find a way to cover the price of education before the benefits can be realized. During the past two decades, the price of education in the United States has increased dramatically and at a rate approximately twice the rate of inflation. Between 1980 and 2001, spending at public colleges and universities increased by almost seventy five percent, after accounting for inflation, to over one hundred and thirty five billion dollars.

In addition, student debt obligations have risen dramatically. The average debt fourth year-students at public four-year colleges have accumulated has risen thirty nine percent to over fifteen thousand dollars since 1993. The average debt fourth year-students at private four-year colleges have accumulated has risen forty nine percent to over twenty three thousand dollars since 1993.

In 2005, there were approximately four thousand degree-granting colleges and universities in the United States. In October of 2005, according to the U.S. Department of Labor, there were eleven million sixteen to twenty-four year-olds enrolled in colleges in the United States. This disparity between the supply of and demand for education means that while education is one of the best investments an individual can make, the price risk of education is difficult to hedge because there are many more buyers of education (i.e., students and families) than there are sellers (i.e., colleges and universities). The difficulty related to hedging the price risk of education demonstrates that there is a clear and pressing need for the current invention.

Like the price of education, the price of producing educational athletics, particularly collegiate athletics, in the United States has increased dramatically in the past two decades. At the collegiate level, the amount of revenue that most institutions must allocate from academic resources to balance athletic budgets is increasing. Recent research indicates that the rate of increase in athletic expenditures is tripling that of spending in higher education overall. In other words, the price of athletics is increasing at the equivalent of six times the rate of inflation. It has recently been reported that athletic programs at public institutions receive more than one billion dollars in student fees and general school funds and services. Without outside funding, fewer than ten percent of athletic departments would have been able to support themselves with ticket sales, television contracts and other revenue-generating means. Most of these institutions would have lost more than five million dollars in a single year. Thus, it is clear that the price of athletics is sympathetic with the price of education.

Athletics and education and the business of athletics and education, particularly the business of collegiate athletics, has experienced revenue growth in recent years. Assets related to athletic programs and education programs often generate millions of dollars in revenue. However, the athletic prospects who are the students that contribute to the generation of this revenue do not share in it. Rather, as documented in testimony before Congress in 2003, they often live in poverty. The risk of poverty to prospects who contribute to the generation of athletic revenue demonstrates that there is a clear and pressing need for the current invention.

Furthermore, institutions do not have adequate tools for managing economic risk related to athletic program assets and education program assets. For example, the president of the National Collegiate Athletic Association (NCAA) has publicly stated that Division I collegiate athletics "do[es] not have a sustainable business model" despite the fact that: (a) participating institutions generate millions of dollars via operation of their athletic programs that is not subject to taxation; (b) these institutions do not pay any wages to the athletes who contribute their physical efforts to generating the revenue; and (c) the majority of these institutions provide additional cash subsidies to athletic programs by charging fees to all students attending the institution. In addition, the chairman of the NCAA's Task Force on Fiscal Responsibility has stated that "the rate of growth of expenditures and revenues in intercollegiate athletics simply is not sustainable." The former chairman of the NCAA's Division I Board of Directors has testified before the Knight Commission on Intercollegiate Athletics (Knight Commission) about the "inequity of the marketplace" for athletic prospects participating in collegiate athletics and has stated that higher education has not "been able to address how to use education as a commodity." Finally, the former president of the Knight Commission has said that he does not believe that there will be a time when the NCAA or its members "do something so dramatic and wonderful that it really changes the situation." These statements and findings demonstrate a clear and pressing need for the present invention.

In all collegiate athletic environments, one of the greatest risks to a program is the fierce competition among educational institutions to recruit and retain the most promising athletic prospects in order for an institution to maximize the chances of continuously maintaining an athletic program that is academically, athletically, and economically successful. At the collegiate level, during the off-season (i.e., that time of the year when an athletic program's teams are not engaged in on-field play with competing teams), an institution seeks to persuade desirable prospects to commit to attending that particular institution and participating in the institution's athletic program. Most or all institutions use a standardized contract known as a National Letter of Intent (NLI) to secure a prospect to the exclusion of other competing institutions. According to NCAA Bylaw 13.02.08, the NLI is "utilized by subscribing member institutions to establish the commitment of a prospect to attend a particular institution."

The NCAA considers the NLI to be a binding agreement between a prospect and an institution in which the institution agrees to provide the prospect a grant-in-aid for one year in exchange for the prospect's agreement to attend the institution and participate in the designated athletic program for that year. The time periods for a prospect to sign an NLI vary by sport. For example, the NLI signing period for college football prospects is open from approximately December 21 through January 15 (for junior college prospects) and approximately February 1 through April 1 (for high school prospects). In the case of football, the prospect who signs an NLI typically delivers himself to the institution by the following July or August. The NLI is binding for a four-year term.

The NLI is a type of unregulated contract known as a forward contract that is similar, but not identical, to a regulated commodity futures contract (also known as a future). A traditional forward contract can be settled only by physical delivery of an underlying commodity and cannot be cash settled. In contrast to a forward contract, most transactions involving futures do not require the seller of the future to actually deliver the underlying commodity to the buyer. Instead, as the last trading date (known as the settlement date) approaches, the buyer and seller execute offsetting contracts, thereby exiting the market and taking a corresponding profit or loss. In other words, a futures contract can be cash settled. These attributes allow a futures contract to mimic the equivalent of real ownership of a commodity without either trader actually obtaining anything but the economic results of the transaction. In general, a future is a standardized contract to buy or sell an underlying commodity or instrument (such as grain, oil, or currency) at a future date and at a set price specified on the last trading date. Unlike traditional forward contracts and unregulated derivative contracts that can be traded on an unregulated over-the-counter (OTC) market, a commodity future can be traded only on a regulated futures exchange known as a designated contract market (DCM).

In a commodity market that underlies a DCM, producers of commodities (such as a grain farmer) and users of commodities (such as a cereal manufacturer) enter into contracts to buy or sell a fixed amount of a particular commodity on a cash (or spot) market. The unpredictable nature of underlying commodities markets led to the development of futures markets as a method for producers and users of commodities to spread the economic risk of price fluctuation and other uncertainties. By trading futures on a DCM, producers and users hedge and manage their economic risk by providing an investment opportunity to investors whose money injects liquidity into the market. By engaging in such a hedging transaction, a producer or user can shift or offset economic risk to the investor seeking economic reward. To offset risk in this manner, a hedging producer or user typically takes on a financial obligation that is opposite to his or her obligation in the underlying commercial transaction.

Hedging is not gambling. In a publication entitled *The Economic Purpose of Futures Markets*, the Commodity Futures Exchange Commission (CFTC), which is the federal agency with regulatory authority over futures and related options trading in the United States, stated that "[m]any people think that futures are just about speculating or 'gambling.' While it is true that futures markets can be used for speculating, that is not the primary reason for their existence. Futures markets are actually designed as vehicles for hedging and risk management, that is, to help people avoid 'gambling' when they don't want to."

In contrast to regulated futures markets, participants in gambling activities do not have any underlying commercial relationship. Unlike regulated futures markets, sports gambling activities cannot have any producers with bona fide hedging interests because laws, rules, regulations, league bylaws, and player contracts prohibit teams and their players from buying or selling a commercial interest in their own performance or in the performance of their rivals. Any potential hedging producer (i.e., a team or player) is strictly prohibited from taking a financial obligation that is the opposite of the obligation to perform to the best of his or her ability in the underlying sporting event. Indeed, in the infamous 1919 World Series, eight members of the Chicago White Sox allegedly sold a commercial interest in their future performance against the Cincinnati Reds and then "shorted" their performance during several games of the World Series competition. Thereafter, the Commissioner of Major League Baseball banned the eight players from organized baseball for life. The whole sports gambling industry is based on the outcome of a sporting event or events as determined solely by the performance of the teams or individuals engaged in the sporting event or events. Thus, instruments that pay dividends that are contractually tied to the underlying performance of a team or individual on a field or court (the output of a team or individual) are not futures, even if such instruments are labeled or referred to as derivative contracts.

An option contract (also referred to as an option) is another type of contract that is traded on a regulated exchange. An option, such as that used in a futures market, is a right, but not an obligation, to buy or sell a future or a commodity at a present fixed price called the exercise price (or strike price). The buyer of an option pays a fixed price, called a premium, to the option writer for this right. A call option is the right to buy a future or a commodity at the strike price, and has positive economic value (also known as in-the-money) when the future market price of the future or commodity is greater than the strike price. A put option is the right to sell a future or a commodity at the strike price, and has positive economic value when the future market price of the future or commodity is less than the strike price.

The price of a regulated commodity contract such as a future or option is established when the contract is made in a trade on a regulated DCM. Numerous such exchanges exist throughout the world. Examples of such regulated exchanges in the United States include The Chicago Mercantile Exchange and The New York Mercantile Exchange. In an exchange's traditional form, buyers and sellers engage in trading through intermediaries such as brokers and merchants who use an open outcry system in an exchange pit (also known as a trading floor). Under this traditional system, the exchange acts as both a clearinghouse and regulator of the market.

The ascendancy of electronic (or computer-based) trading has supplemented (and in some cases supplanted) the open outcry system, increased individual direct access to futures markets, and made it easier for traders to enter and exit futures markets directly. Trading on a DCM can be either intermediated or direct (i.e. non-intermediated). A broker or merchant trades on behalf of and for the benefit of the buyer or seller when trading is intermediated. A buyer or seller trades directly on his or her own behalf and for his or her own benefit when trading is direct. The technological advances mentioned above have increased the feasibility of direct trading of commodity contracts, including direct trading of futures and options.

Futures and options trading is the natural outgrowth of maintaining a continuous supply of seasonal products like agricultural crops. Institutional athletic programs also need a continuous supply of a seasonal product such as NLI commitments. In this regard, the present inventors have recognized that collegiate athletic recruiting markets (as well as collegiate education recruiting markets) function in a manner similar to that of traditional commodity markets.

A prospect and an institution that enter into an NLI are natural counterparties to an illiquid transaction. On one hand, a prospect takes a short position and sells his short-term athletic participation for access to the future earning power of a degree. The institution takes the long position and buys the potential that the athlete will contribute to the long-term athletic and economic well-being of the institution. On the other hand, the prospect can be characterized as the party who takes the long position and buys the potential future return on the institution's academic and athletic programs paying off in the form of a degree and long-term economic prosperity. Under such a view, the institution can be characterized as taking the short position and selling one year of grant-in-aid in exchange for one year of athletic participation and resulting revenue.

The characterization of one party's position as short and the other party's as long is not determinative. Rather, as counterparties, a prospect and an institution have a shared bona fide interest in hedging the risk that the price of the NLI commitment will change for the prospect or the institution after the NLI commitment has been executed. For example, a prospect bears the risk that he or she will live in poverty while participating in athletics and the risk that the demands of athletic participation will take precedence over academic development. The institution takes the risk that its spending on its group of prospects will in the aggregate exceed the economic return to the institution, and the risk that the prospect will not attain an academic degree.

Rival supporters of athletic programs also are natural counterparties. For example, the counterparty to an Ohio State football supporter is a Michigan football supporter or a Penn State football supporter. However, unlike the prospect/institution relationship, rival supporters of college athletic programs have no overlapping long-term interest. For example, when Ohio State competes against Michigan or Penn State on the field during a game, the competition between rival supporters of athletic programs is purely a binary, zero-sum (or winner-take-all) proposition.

The competition between rival supporters of competing institutions is a zero-sum competition because a "win" on a football field or other athletic field or court is a purely rival good or interest (rival interest). A purely rival interest has the property that its use by one precludes its use by another. For example, in a football game between Ohio State and Michigan to determine which of the two teams will compete in a Rose Bowl football game, a successful Ohio State performance that results in a win for the Ohio State football team precludes the use of the win by the Michigan football team. As a result, the Ohio State football team goes to the Rose Bowl and the Michigan team does not. Thus, the win resulting from the Ohio State and Michigan competition is a purely rival interest.

In contrast, an institution's athletic program that consists of an aggregate of athletic teams (e.g., football, basketball, volleyball, field hockey, etc.) is a non-rival, partially excludable interest (non-rival interest) because an athletic program as an organizational unit does not actually compete directly on any field or court with any other institution's athletic program. No meta-competition between athletic programs exists. An interest in an institution's athletic program can be used and enjoyed by any person in the public without limiting the use or enjoyment of any other person's interest in the same athletic program. Thus, an institution's athletic program is non-rival.

A non-rival interest has the property that its use by one firm or person in no way limits its use by another firm or person. A purely non-rival interest cannot be traded in a competitive market. However, a non-rival, partially excludable interest can be traded in a competitive market. Generally, an example of a non-rival, partially excludable interest is a design of a membership organization. For instance, beginning in 1971, the New York Stock Exchange (NYSE) was designed as a private, non-profit association. In 2006, the NYSE merged with Archipelago Holdings, a provider of electronic trading technology, and became a public company. As with other public companies, investors now can trade ownership interests (shares) in the NYSE itself.

Another example of a non-rival interest is a design of an institution's athletic program. Thus, while the Michigan football team's loss to Ohio State precludes the Michigan football team from participating in the Rose Bowl, the outcome in no way limits the interest of any person in either Michigan's athletic program or Ohio State's athletic program. Notwithstanding the outcome of the game, all persons in the public remain free to take a tangible commercial interest in either program or both programs by entering into a contract to sponsor the athletic program or by purchasing tickets to athletic events or by making financial donations to the athletic program(s) or their parent institution(s). In addition, notwithstanding the outcome of the game, all persons in the public remain free to take an intangible interest in either program or both programs by simply rooting for teams sponsored by either athletic program in future athletic events. The design of the NCAA is but another example of a design of a non-rival interest, as is the design of the exchange of the present invention.

No non-rival educational athletic program commodity options or futures currently exist. In addition, no exchange currently exists for an institution, a prospect or the public to hedge their long-term risks related to a prospect entering into an NLI (or related contractual) commitment with a particular institution or to determine the price of an institution's non-rival athletic program. Likewise, no exchange currently exists for the non-NLI students at an institution to manage the risk of the rising cost of education during their years at the institution. Accordingly, it is desirable that a device and method of operating the device be established that facilitates trading non-rival, partially excludable educational athletic program commodity options and futures. It is additionally desirable that such a device and method be established to provide institutions with a tool to manage the risks related to the operation of athletic programs and education programs. It is further desirable that such a device and method be established to provide athletic prospects with a tool to manage the risks related to their participation in athletics, including the risk of living in poverty while participating in athletics. It is further desirable that such a device and method be established to provide the public with a hedge against the increasing price of education. It is further desirable that such a device and method be established to provide institutions with a means for growing revenue. It is further desirable that such a device and method be established to inject liquidity into athletics and education. It is further desirable that such a device and method be established to subsidize the growth of the cumulative effect of higher education (human capital). It is further desirable that such a device and method be established to promote economic growth.

BRIEF SUMMARY OF THE INVENTION

The proposed exchange would meet these desires by providing a tool to manage the risks associated with producing collegiate athletic programs and educational programs. In the present context, the term "exchange" or the like refers (either collectively or individually) to the device and method proposed herein, and can be used interchangeably.

In one form, the present invention embodies a futures and options trading exchange platform on which, in exchange for payment of certain premiums, qualified institutions and qualified prospects (the latter also referred to as qualified students) can buy options on an affiliated institution's non-rival athletic program (for example, $SYM_{OHIOSTATE}$). Upon exercise of those options, payment of a certain exercise price or strike price, and payment of a transaction fee, those institutions and prospects can sell one or more futures contracts related to that non-rival athletic program. In addition, all other investors participating in trading on the exchange would pay a transaction fee to buy and sell futures on any non-rival athletic program (for example, $SYM_{OHIOSTATE}$, $SYM_{MICHIGAN}$, $SYM_{TEXAS}$, $SYM_{DUKE}$, $SYM_{NOTREDAME}$, $SYM_{KENTUCKY}$, $SYM_{NEBRASKA}$ or the like). Revenues generated from the transaction fee, less the cost to establish and operate the exchange, can be distributed to the general scholarship funds of every institution trading on the exchange. Thus, by subsidizing tuition, the exchange would facilitate a public hedge against the increasing price of higher education. It will be appreciated by those skilled in the art that even though the majority of the discussion herein is within the context of collegiate athletics, it will be understood that the proposed exchange can be extended to manage the risk and cost associated with operating non-rival athletic programs sponsored by other educational institutions such as high schools, prep schools, community colleges, and the like.

Under the proposed exchange, a prospect that signs an NLI (or similar contract) with a particular institution can, for a premium (for example, $100), qualify to buy the right, but not the obligation (a call option), to buy a predetermined number of futures contracts (for example, one thousand) of that institution's non-rival athletic program for a fixed price per future (for example, $1 per future). Likewise, for a premium per prospect (again, for example, $100), that institution can qualify to buy the right, but not the obligation (a call option), to purchase futures contracts for a fixed price (again, for example, $1 per future) for use in its general scholarship fund or at its discretion in a manner consistent with applicable legislation and/or regulation. Identical rights would accrue to all institutions and their prospects that participate in trading on the present exchange.

Once an institution or prospect buys an option to purchase futures, the institution or prospect can exercise the option at the strike price (in the example above, $1) and sell the futures to an investor (for example, a member of the general public who participates in the exchange of the present invention) at the market price. If the option is in-the-money (i.e., the market price exceeds the strike price) at the time the institution or prospect exercises the option and sells the future, the institution or prospect will profit from the transaction.

Similar to the pre-2006 NYSE, the NCAA is a private, non-profit association. The NCAA regulates the eligibility of prospects for participation in collegiate athletics. The NCAA's regulations pertaining to eligibility are not binding on the trading exchange of the present invention. Nevertheless, the options and futures to be traded on the present invention's trading exchange are expressly authorized by NCAA regulations, and are consistent with the spirit of the regulations. The NCAA only prohibits a prospect from receiving pay or gifts or "extra benefits." The NCAA does not prohibit a prospect from buying regulated financial products or making any sort of investment that is subject to risk, such as an investment opportunity involving the options and futures created by the present invention. On the present invention's trading exchange, prospects will not receive pay or gifts. Indeed, the present invention's trading exchange incorporates the exact opposite relationship, as prospects must pay a premium for such options, an exercise or strike price for futures contracts, and the same transaction fees that all investors must pay.

NCAA Bylaw 16.02.03 expressly provides that "[r]eceipt of a benefit by student-athletes [a/k/a prospects] or their relatives or friends is not a violation of NCAA legislation if it is demonstrated that the same benefit is generally available to the institution's students or their relatives or friends or to a particular segment of the student body (e.g., foreign students, minority students) determined on a basis unrelated to athletics ability."

On the trading exchange of the present invention, the benefit of these options and futures (if any) will be available to both prospects and other students (through the university as intermediary) on a basis other than athletic ability. The benefit (if any) to prospects and other students is uniform in that it is a hedge against the respective economic risks borne by athletic prospects and by other non-athlete students. Prospects bear the short-term risk that they will live in poverty while participating in collegiate athletics, but do not bear the risk that the price of their education will increase as the institution absorbs that cost. In contrast, other non-athlete students are not prohibited from accepting pay and benefits by NCAA rules or time commitments to collegiate athletics. However, such students bear the short-term risk that the price of education will increase. In other words, the short-term risk borne by athletic prospects is the inverse of the short-term risk borne by non-athlete students. Moreover, both prospects and other non-athlete students share the long-term risk that their respective short-term risks will interfere with their shared long-term interest in obtaining an academic degree. While the long-term risks borne by prospects and other students are directly related and their short-term risks are inversely related, the trading exchange of the present invention provides "the same benefit" to both prospects and other non-athlete students in the form of a hedge against their economic risks.

In addition, by generally subsidizing tuition on a basis unrelated to athletic ability, the trading exchange of the present invention provides a subsidy of the production of human capital on a basis unrelated to athletic ability. Human capital is a distinct measure of the cumulative effect of activities such as formal education. In other words, human capital is a distinct measure of the accumulation of knowledge derived from higher education. According to economist Paul Romer's model in a paper entitled *Endogenous Technological Change*, "knowledge enters into production in two distinct ways. A new design enables the production of a new good that can be used to produce output. A new design also increases the total stock of knowledge and thereby increases the productivity of human capital in the research sector. The owner of a design has property rights over its use in the production of a new producer durable but not over its use in research. If an inventor has a patent design for widgets, no one can make or sell widgets without the agreement of the inventor. On the other hand, other inventors are free to spend time studying the patent application for the widget and learn knowledge that helps in the design of a wodget. The inventor of the widget has no ability to stop the inventor of a wodget from learning from the design of a widget. This means that the benefits from the first productive role for a design are completely excludable, whereas the benefits from the second are completely non-excludable. In an overall sense, this means that the nonrival design inputs are partially excludable."

Romer's model suggests that what is important for economic growth is "integration not into an economy with a large number of people but rather into one with a large amount of human capital." Subsidizing the general accumulation of knowledge (human capital) by generally subsidizing the tuition of non-athlete students in order to produce economic growth is one of the economic purposes of the present invention.

The trading exchange of the present invention provides a subsidy of tuition expenses of non-athlete students and the accumulation of knowledge (human capital) that is independent of the performance or outcome of any athletic event or events to every institution whose non-rival athletic program is traded on the exchange by providing a percentage of a transaction fee charged for each trade made on the exchange to each institution. Thus, the trading exchange of the present invention is calculated to produce economic growth as measured by the accumulation of knowledge (human capital) that is independent of the outcome of any athletic event or events, which clearly is a basis unrelated to athletic ability.

The institution alone will select those prospects with whom it will enter into NLI commitments and who thereby might benefit from buying options and selling futures. The institution alone, acting as an intermediary, will select those other students who might benefit from that institution's intermediated buying of options and selling of futures. The benefits, if any, that prospects and other students will receive from trading on the present invention's exchange will be determined by trading skill and market forces, which clearly is a basis unrelated to athletic ability. In addition, increased contributions to an institution's general scholarship fund made possible from trading and operation of the exchange of the present invention will benefit all students attending that institution, which is also a basis unrelated to athletic ability.

On the present invention's trading exchange, the options are similar in nature to tuition as well as athletic scholarships and academic scholarships that institutions have provided to athletic prospects and scholars since the 1950s. Like tuition or a scholarship, the option is an investment in prospects, other students and the institution that carries both potential risk and potential reward to the same. The option is leverage that prospects and the institution mutually and symbiotically employ in pursuit of a better future for all students, as opposed to an immediate benefit for one group at the expense of another group.

There is precedent in higher education for using market designs, methods, and tools for educational purposes. For example, the University of Iowa Tippie College of Business has operated the Iowa Electronic Markets as part of its "research and teaching mission." The Iowa Electronic Markets are a group of real-money futures markets that allow traders to buy and sell contracts based on political election results.

In addition, in January of 1956, Nobel Prize-winning economist Vernon L. Smith created a student market in his classroom in which student-traders engaged in trading with one another within the classroom. Smith found that the classroom market maximized the group's total gain from trading. In other words, the classmates could not have done any better had someone with perfect knowledge told them what to do. According to James Surowiecki's book *The Wisdom of Crowds*, "in the four decades since Smith performed that first experiment and published the results, they have been replicated hundreds, if not thousands, of times, in ever more complex variations. But the essential conclusion of those early tests—that, under the right conditions, imperfect humans can produce near-perfect results—has not been challenged."

Section 2(a)(1) of the Commodities Exchange Act (the Act) defines a "commodity" to include all "goods and articles . . . and all services, rights and interests in which contracts for future delivery are presently or in the future dealt in . . . " According to a former chairman of the CFTC and the author of the treatise *Commodities Regulation*, under this section of the Act: "Congress expanded the definition of commodity to encompass virtually anything that is or becomes the subject of futures trading, intangible as well as tangible . . . . A fair reading of the amended and expanded definition suggests that, as for 'all goods and articles . . . and all services, rights and interests,' their status as statutory commodities does not emerge until they become the subject of futures trading. Although this method of converting something into a commodity may seem curious, it illustrates an important principle of commodities regulation: Its interest is in a form of economic activity rather than in the attributes or character of the underlying subject. The economic activity in question is futures and commodity options trading; the nature of the commodity does not affect the regulatory result."

The subject assets underlying the options and futures traded on the exchange can be thought of as a basket (i.e., aggregate) of NLI commitments that each institution's non-rival athletic program accumulates through the recruiting process. Unlike the trading of some traditional commodity futures such as wheat or oil, the cash value of a basket of NLI commitments is unknown and currently is not measured by any external economic index or reference point. Nevertheless, a commodity does not require a cash market in order for the commodity to be traded as a future. As observed in *Commodities Regulation*: "[M]ost futures and commodity option contract prices, unlike securities, are normally related to prices actively and continually made in a separate commercial market, and this interrelationship imposes a form of price discipline on futures contracts. The latter, in other words, will seldom deviate substantially from prices being actually paid for the same commodity in the commercial world. The reasonableness of most futures prices, therefore, can be tested against an external reference point. No such opportunity is presented to the securities investor, who can look only to the securities market itself for price information. Techniques have been devised, of course, such as the test of price-earnings ratio, to analyze the attractiveness of a particular security's current price, but these formulas are fraught with subjective evaluation and are frequently ignored . . . . Financial futures and options reflect the underlying value of government obligations, foreign currencies, and stock indexes, all of which can be said to lack the firmer external reference points applicable to other commodities." Weather options and futures are contracts traded on regulated DCMs where the underlying commodity (weather) is not benchmarked in monetary units or subject to a cash market.

Institutions face cyclical periods of interest in their non-rival athletic programs. For example, college football operates pursuant to a business cycle composed of four quarters or seasons. A first season is made up of pre-season preparation and non-conference competition, a second season is made up of conference competition and bowl games, a third season is made up of recruiting competition and spring practice, while a fourth season is the quiet period between seasons three and one. By way of example, NCAA Division I-A institutions face a cyclical period of relatively low interest in their football programs during the fourth quarter discussed above, which runs from the end of the recruiting season and spring practice until the majority of new prospects begin arriving on campus in the later summer and early fall. As with weather futures, the present invention will enable institutions and prospects to make available a large base of written options that will provide liquidity for a seasonal futures market in NLI commitments.

The basket of NLI commitments known as recruiting classes that make up a non-rival athletic program are the assets underlying the present invention's trading exchange, and as mentioned above with weather futures, are not measured in monetary units. Nevertheless, an investor who uses the exchange of the present invention to invest in a particular institution's non-rival athletic program will have at least four external reference points or benchmarks by which he or she can judge an investment: (1) an institution's and a prospect's option exercise price per future (for example, $1); (2) a market price or prices at which futures related to competing institutions are trading; (3) an NCAA-set settlement bid floor price of $0; and (4) an exchange-set maximum ask ceiling price and settlement ask price (for example, $100). In situations involving a companion market, an additional benchmark, that of a composite or aggregate index of some or all of the institutions, may be used.

In one embodiment of the present invention, the value of a non-rival athletic program's future is the absolute future value between $0 and $100 of the non-rival athletic program to a person with a tangible interest (i.e., commercial or contractual interest) or intangible interest in the program. The future value of the non-rival athletic program is nothing to a person who values the program at $0 and everything to a person who values the program at $100 and something in between for values $0 to $100.

In a typical futures market, an investor that buys or sells a commodity future such as oil knows the absolute spot price of the oil on the day he or she purchases the future, while the future settlement price is liquid and fluctuates relative to the spot price. The present invention embodies the inverse scenario. An investor that buys a future in a non-rival athletic program would know that, consistent with NCAA rules, the absolute future settlement price of the future on the primary market would be $0, but the spot price of the non-rival athletic program would be liquid and fluctuate relative to the price of the futures of the non-rival athletic programs of all other competing institutions traded on the exchange. Likewise, an investor that sells short a future in a non-rival athletic program by depositing $100 with the exchange and borrowing a future would know that, consistent with exchange rules, the absolute future settlement price would be $100, but the spot price of the non-rival athletic program would be liquid and fluctuate relative to the price of the futures of the non-rival athletic programs of all other competing institutions traded on the exchange. In other words, an investor will not be speculating where a future will settle at the end of trading. Rather, an investor will be speculating as to what traders will be willing to invest in NLI commitments at every instant in time prior to settlement. As Nobel-prize winning economist Kenneth Arrow stated in *The Theory of Risk-Bearing: Small and Great Risks*, "[w]hat the markets for risk-bearing achieve is an efficient distribution of the risks as viewed before the event. In this respect, it is like the workings of the price system in general. If a commodity, e.g., oil becomes less available, the economy is going to be worse off. What the price system does is to make the loss to society as small as possible." The present inventors expect that what one aspect of the trading exchange of the present invention will achieve is an efficient distribution of the risks of producing non-rival athletic programs. In this respect, the trading exchange of the present invention works like a price system for the purpose of insuring and sustaining the unique collegiate model of athletics. Insuring and sustaining the unique collegiate model of athletics is one of the economic purposes of the present invention.

The discussion above describes the operation of a risk-neutral exchange with a single primary market. In a variation, investors also will be able to speculate and hedge the risk of buying and selling futures in the primary market by trading in a companion market that aggregates and indexes the price of all futures traded on the exchange. At all times, the public trading of all futures will yield an aggregate mean price per future. In the companion market, an investor can buy an index future contract (index future) if he or she expects the aggregate mean price to increase. Correspondingly, an investor can sell index futures if he or she expects the aggregate mean price to decrease. Thus, investors in index futures will speculate on where the aggregate mean price per future will finally settle, and can use index futures to hedge underlying future trading in the same way that the trader of traditional commodities can hedge his or her position by trading commodity index futures, such as Goldman Sachs Commodity Index Futures (GSCI Futures).

In one embodiment of the present invention, the final settlement price of the index futures will be the special quotation of the aggregate mean price per future on a pre-determined, final day of the trading period. Investors holding open positions in index futures at the time of the expiration of trading will realize a gain or suffer a loss based on the final settlement price and will receive a payout based on a pari-mutuel risk-sharing rule or some other risk-sharing rule.

In another embodiment of the present invention's companion market, the market price of any index future traded on the system, and therefore the risk assumed by every investor in index futures, would be strictly bounded between two fixed endpoints. At expiration, the payoff will be based on the ending aggregate mean price per future, relative to the index future range. If the aggregate mean price per future ends at or below the floor, the payoff is $0 for the buyer and the stated contract size for the seller. If the aggregate mean price per future ends at or above the cap, the payoff is the stated contract size for the buyer and $0 for the seller.

If the aggregate mean price per future ends between the floor and the cap, the stated contract size is split between the buyer and seller, where the buyer receives $A for every B tick the aggregate mean price per future finished above the floor and the seller receives $X for every Y tick the aggregate mean price per future finished below the cap, such that payoff for the buyer increases when the aggregate mean price per future ends closer to the cap, and payoff for the seller increases when the aggregate mean price per future ends closer to the floor. In addition, investors could close their positions prior to expiration by selling their index futures at any time before the last trading date. In such cases, the profit or loss is the difference between the price received and the price paid. It will be appreciated by those skilled in the art that other variations of futures and options contracts based on the index can be traded on the companion market.

The exchange will not permit qualified prospects or qualified institutions to take, own or otherwise control a short position on any contract traded on the exchange. Qualified institutions and qualified prospects will be strictly limited to taking, owning or controlling long positions. By limiting the qualified institutions and the qualified prospects to taking, owning or controlling long positions in their particular non-rival athletic program, the exchange of the present invention will eliminate the incentive of any qualified institution or qualified prospect to use less than best effort when participating in such non-rival athletic program.

The exchange will not permit margin accounts. Thus, for an investor to take a long position (i.e., buy futures) or a short position (i.e., sell futures) on a given number of futures contracts, he or she will have to post in an account a deposit adequate to cover the difference between the bid/ask price and the settlement price. For buyers of futures, the deposit will be equal to the bid price. For non-institution and non-prospect sellers of futures (i.e., supporters and investors), the deposit will be $100 per future. For an institution or a prospect, no deposit will be necessary as long as a bidder with an unfilled order greater than the exercise or strike price (for example, $1 per future) exists to take the institution's or prospect's sale price offer. If no such bidder exists and an institution or a prospect still desires to exercise options, the institution or prospect will have to make the appropriate deposit.

Consistent with well-established principles of commodity markets, the exchange will employ reasonable open interest limits and position limits to prevent any person or entity from cornering, squeezing, or otherwise manipulating a non-rival athletic program. For example, limits that restrict an investor to a total of one thousand open interests and/or positions at any one time essentially would limit an investor to bidding for one prospect at a time. Such pro-competitive limits will increase liquidity within the market.

In accordance with a first aspect of the present invention, a method of electronically trading futures contracts associated with non-rival athletic programs of one or more educational institutions is disclosed. The method includes granting an option to one or both of a qualified student and a qualified educational institution that sponsors a non-rival athletic program that the student participates in, configuring an exchange to execute trading of one or more futures contracts, and facilitating at least one trade on the exchange between a seller of one or more futures contracts and a buyer of one or more futures contracts. In the present context, a student and his or her corresponding educational institution may become qualified by entering into an underlying contractual commitment, such as the aforementioned NLI or the like. Also in the present context, futures contracts tradable on the exchange may include both those that are initially bought by the qualified student, educational institution or both, as well as those initially or subsequently procured by investors.

Optionally, the method includes storing trade information data corresponding to each of the trades. Such data may be aggregated to provide information relating to market liquidity, trading or transaction revenues and other such data as the exchange operators, regulators and others may find useful. Configuring the exchange may include electronically connecting a host computer to a remote client computer through a network. In this way, a trading algorithm that can be installed in or otherwise cooperative with one or more of the host computer, network and remote client computer performs the one or more arranged trades. This may also include functionality beyond the mere executing of trades, such as keeping records of the trades made. In this way, the trading algorithm (or another algorithm cooperative with the trading algorithm) may be programmed to establish user accounts. In this way, automated record-keeping may be implemented. This can be a valuable way to show each user's transactions, as well as a way to credit or debit the user's account. In one preferred embodiment, the exchange operates as a DCM that complies with operating requirements of the Commodity Exchange Act.

According to another aspect of the present invention, a method of managing economic risk associated with producing educational non-rival athletic programs is disclosed. The method includes qualifying one or more educational institutions and one or more prospects within that institution's non-rival athletic program. Once qualified, the prospect, educational institution or both may purchase (for a fixed premium price) an option to purchase (at a fixed strike price) one or more futures contracts in the institution's non-rival athletic program. The method further includes granting the option to the qualified institution, student or both so that they may purchase futures contracts once the option has been exercised. The method also includes facilitating the exercise of the option. For example, in a configuration where the method is at least partially achieved over an electronic exchange, such facilitating may be in the form of the exchange (including trading software) allowing the qualified student or representative of the qualified educational institution to proceed with paying an option premium, after which the qualified student or representative of the qualified educational institution may be able to purchase one or more of the futures contracts through an account held on the exchange by the qualified student or representative of the qualified educational institution. The method additionally includes matching a bid to purchase and an offer to sell one or more futures contract. The method also includes collecting data associated with each matched trade. Such data may include price data, volume data as well as other data. Furthermore, final settlement prices are established for the futures contracts, as well as bids to purchase and offers to sell the futures contracts that are neither matched nor cancelled by the predetermined date.

Optionally, the qualified educational institution and student achieve their qualified status by entering into an underlying binding agreement that obligates the institution to provide the student with the opportunity to attend the institution (such that the student may participate in academic and athletic program offerings of the institution) in return for the student to provide his or her participation in the non-rival athletic program. Typically, the institution satisfies its part of the agreement by providing grant-in-aid or other form of tuition reimbursement, as well as reimbursement of the cost of other necessities. As discussed above in conjunction with the previous aspect, the underlying agreement may be in the form of an NLI or other written instrument. In a particular form, the method may further include prohibiting the student and the institution from selling or trading contracts and options associated with any other educational institution's non-rival athletic program. In another form, the method may be used to prohibit any student and his or her respective institution from opening, owning or controlling a short position in the market in the form of one or more open futures contracts in that educational institution's non-rival athletic program.

In a preferred form, the method operates as a DCM. More particularly, buying and selling of one or more futures contracts on the DCM can be either direct or through an intermediary. In another option, the maximum total number of open interests and positions that may be held or controlled by a single trading entity cannot exceed the number of futures that a qualified student or qualified institution have the right to purchase. For example, if the maximum number of futures contracts that a qualified student or his or her respective educational institution has the right to purchase is one thousand, then an investor may control no more than a total of one thousand open interests and positions at any one time. In the present context, an investor is either an individual (such as those that are registered with the exchange), an intermediary of an individual or pool of individuals. The method may further include facilitating trading a composite index. In such form, such an index (with the corresponding contract referred to as an index futures contract) represents an unleveraged, long-only investment in futures contracts of one or more of the qualified (i.e., participating) educational institution's non-rival athletic programs that are traded on the designated contract market. The composite index serves as a benchmark of the value of the educational institution's non-rival athletic program, or as a benchmark of the value of the aggregate value of all non-rival athletic programs traded on the exchange. In this way, the composite index serves as a measure of the educational institution's non-rival athletic program, or as a measure of the aggregate value of all non-rival athletic programs traded on the exchange over time.

A future final settlement value of a futures contract to purchase an interest in the institution's non-rival athletic program can be fixed at zero dollars, while a future final settlement value of a futures contract to sell an interest in the institution's athletic program is fixed at a value greater than zero dollars. In one example, the future value of the futures contract is between a floor value of zero dollars per futures contract and a ceiling value of one hundred dollars per futures contract.

According to another aspect of the present invention, a method of hedging the risk of future education costs is disclosed. The method includes granting options to purchase futures contracts to at least one qualified educational institution that sponsors a non-rival athletic program and one or more qualified prospects within that educational institution's non-rival athletic program. In addition, the method includes configuring an electronic DCM to execute trading of one or more of the futures contracts, facilitating trading on the electronic DCM between a seller of at least one of the futures contracts and a buyer of at least one of the futures contracts. Such a transaction generates a transaction fee for the operator of the exchange, and the operator may distribute at least a portion of the transaction fee revenue to a scholarship fund or other fund to further the educational institution's academic mission. Optionally, the method can be used to subsidize at least a portion of tuition expense of one students in the student body of the qualified educational institution. Such subsiding may come from a portion of the revenues generated by the transaction fees.

In accordance with another aspect of the present invention, a device for trading derivative contracts of one or more educational institutions is described. The device includes a data input, a data output, a communications link and a computer readable medium onto which trading software or a related algorithm can be placed or operated. The data input receives trading instructions or requests for trading information from the trader, while the data output can convey (for example, visually through a display screen or hard copy printout, or aurally through a speaker) either the input trading instructions or request for trading information that may be of interest to the trader. Such trading information may include, among other things, a list of participating educational institutions, current bid or ask prices, quantity available, open contracts, recently-completed contracts, or news or other information pertaining to one or more contracts that are available for trade, as well as the educational institutions to which those contracts correspond. The communications link allows electronic connection between one or more of the data input and data output to a trading exchange, while the computer readable medium is cooperative with them such that the trading software or related algorithm loaded on the medium can instruct one or more parts of the device to perform a trade.

Thus, when the trader places an offer to sell or a bid to buy the contract through the data input, an algorithm on the computer readable medium processes data associated with the bid or offer and compares it against currently available contracts and their price, quantity or other trading parameter in order to establish a trade between the trader and another trader who makes a complementary offer or bid on the contract. In the present context, a complementary bid or offer is one that, upon satisfaction of one or more trading criteria, can be paired with an opposing offer or bid such that ownership of the contract is conveyed from the seller to the buyer in exchange for money, another contract, or item of comparable value. As an example, bids and offers can be matched based on price, quantity or like criteria. Likewise, other factors, such as counterparty credit limit, trade clearing, trade settling or other appropriate indicia may form the criteria necessary to effect matching complementary trade positions. Furthermore, terms such as "bid", "offer" and "ask" are used in the present disclosure in both particular and colloquial forms. For example, the term "offer" may be understood colloquially to represent a general buy or sell request, with no loss of specificity to a particular side taken by a trader in an underlying trade.

In one particular form, the contracts are based on mutually agreed-upon obligations (for example, contractual commitments such as an NLI) between one or more prospects and the educational institution. While the NLI is the most common contractual vehicle for binding an institution and a prospect, the present inventors believe that other such vehicles, either presently known or developed in the future, may be used to ensure an underlying commercial relationship. Thus, any contract that mimics the attributes of an NLI contract would suffice to form the underlying relationship. The proposed exchange would provide a trading platform on which qualified institutions and qualified prospects could purchase and exercise options and sell futures on their specific non-rival athletic program, while the general public could buy and sell futures on any participating institution's non-rival athletic program. The present inventors believe that using the NLI as the underlying commodity or instrument is sufficient to sustain significant market activity, as recruiting and signing prospects is already embedded in the public consciousness.

The device is preferably in the form of a computer-implemented trading system that involves a network, including one or more host computers and one or more client computers linked to the host. Such a system allows buy and sell orders initiated at the client devices to be matched up by the host machine. There are numerous optional configurations for the computer readable medium, including hard disk drive, compact disk (CD), digital video disk (DVD), floppy disk, flash memory and propagated signal transmitted over the communications link. The computer readable medium can be resident with one or more of the data input, data output and trading exchange. In the present context, the term "resident" means that physically the medium is situated in, on or cooperative with the respective device in such a way that together they function as a unitary whole. This may include having the medium adjacent the other components of the computer. For example, if the medium is resident on a laptop computer, it is either enclosed inside or readily attachable to the frame or case of the laptop, or may be signally connected thereto. Likewise, if the medium is resident on a desktop computer, it can be enclosed within or signally connected to the case, input, output or memory. One or more of the data input and data output can be configured as a graphical user interface, thereby facilitating ease of use. In another form, the data input and data output include a client terminal configured to send, receive and view data related to one or more of a placed order, a completed trade or trading information.

In another option, the trading information is arranged in a database that includes identification of one or more educational institution's athletic programs that are available for trading through the device. Other database information may include current trading price and current number of the contract that corresponds to the identified program that are available for trading. Furthermore, the database may also include more detailed contractual obligation information, such as identification of the number of prospects who are contractually obligated to the identified program. The database may also be configured to include identifying information about such prospects. The same could apply to authorized trading intermediaries or pools of the participating institutions. The present inventors envision this as a way to enhance security, as an individual purporting to be a prospect or intermediary or pool could be cross-checked against the database to ensure that the prospect or intermediary or pool in fact has entered into a qualifying underlying commercial relationship.

According to yet another aspect of the invention, a device for trading futures relating to a non-rival college athletic program is disclosed. The device includes a central trading platform, a database made up of a collection of available non-rival athletic programs from which a trader may choose to trade, means for exchanging order information (such as trader input) pertaining to the futures contracts of the non-rival college athletic program, means for executing a trade of futures relating to the non-rival college athletic program and means for informing traders of a contract fill status. Each of the athletic programs within the database includes identification that distinguishes one program and its related futures contracts from another.

Optionally, the central trading platform is an electronic trading platform made up of one or more processing units, one or more memory storage devices to exchange data with the processing unit or units, and related computational componentry. The various means for exchanging, executing and informing may be a computer program that is cooperative with the platform. Thus, the means may be embodied in computer software, firmware or hardware, and includes algorithms that, in conjunction with the aforementioned computational componentry, can perform the desired function. The input interface can receive data associated with futures contracts relating to one or more non-rival college athletic programs selected from the database. As stated above in conjunction with the previous aspects, the derivative nature of the contract (for example, a futures contract) has as an underlying asset a contractual commitment between a prospect and a particular educational institution. In a preferred form the contractual commitment is an NLI between an athletic prospect and the particular college or related educational institution. The computer program module provides instruction to the processing unit so that trader buy and sell orders selected from the database can be matched. The computer program module is further operative to enable not just the trading transaction, but also contract listing, availability, price, quantity or the like. The device may further include the ability to settle a trade and clear the trade. In another option, the device need not be an automated, computer-based system, where some of the features can be used in a manner generally similar to the open-outcry method, where certain functions, such as means for exchanging contract order information, means for executing a trade and a means for informing traders could be performed using human intermediaries equipped with mechanical or electrical members (including paper-based hard copies) to convey and record contract order information. The device may further be configured as an exchange, such that it may be particularly tailored to the trading of futures relating to one or more non-rival college athletic programs. In a particularly desirable form, the exchange can operate as a designated contract market.

According to still another aspect of the invention, an article of manufacture comprising a computer usable medium having computer readable program code embodied therein for executing a trade of one or more futures contracts relating to one or more college athletic programs. In the article, the computer readable program code includes means for causing a computer to accept at least one bid from a buyer, means for causing the computer to accept at least one offer from a seller, means for causing the computer to match the bid and the offer, thereby effecting the trade, and means for causing the computer to notify the buyer and the seller that the trade has been executed. These means may be in the form of program code segments, portions, routines, subroutines or the like to ensure proper execution of the command contained in those means. The program, when installed in an appropriate computer, enables the computer to trade athletic futures contracts (such as the non-rival futures contracts discussed in conjunction with the previous method aspects) on an electronic exchange. The program code recorded on the medium can perform numerous functions, including (but not limited to) listing available futures contracts, accepting trader input, keeping track of the trader's account, displaying information pertaining to currently available trade orders, completing a trade and reporting the results of the trade to the trader. The computer readable program code may include, or have access to, one or more databases that contain contractual obligations between a college and an athletic prospect. In this way, such database and program code can help ensure that a particular college and athletic prospect can participate in trading college athletic futures contracts.

BRIEF DESCRIPTION OF THE SEVERAL VIEWS OF THE DRAWINGS

The following detailed description of the present invention can be best understood when read in conjunction with the following drawings, where like structure is indicated with like reference numerals and in which:

FIG. 3G shows fields where a trader can input a desired quantity of futures contracts, as well as a price per contract;

FIG. 3H shows a verification of trade quantities and prices initiated by the trader in FIG. 3G;

DETAILED DESCRIPTION OF THE PREFERRED EMBODIMENTS

Figure 1:
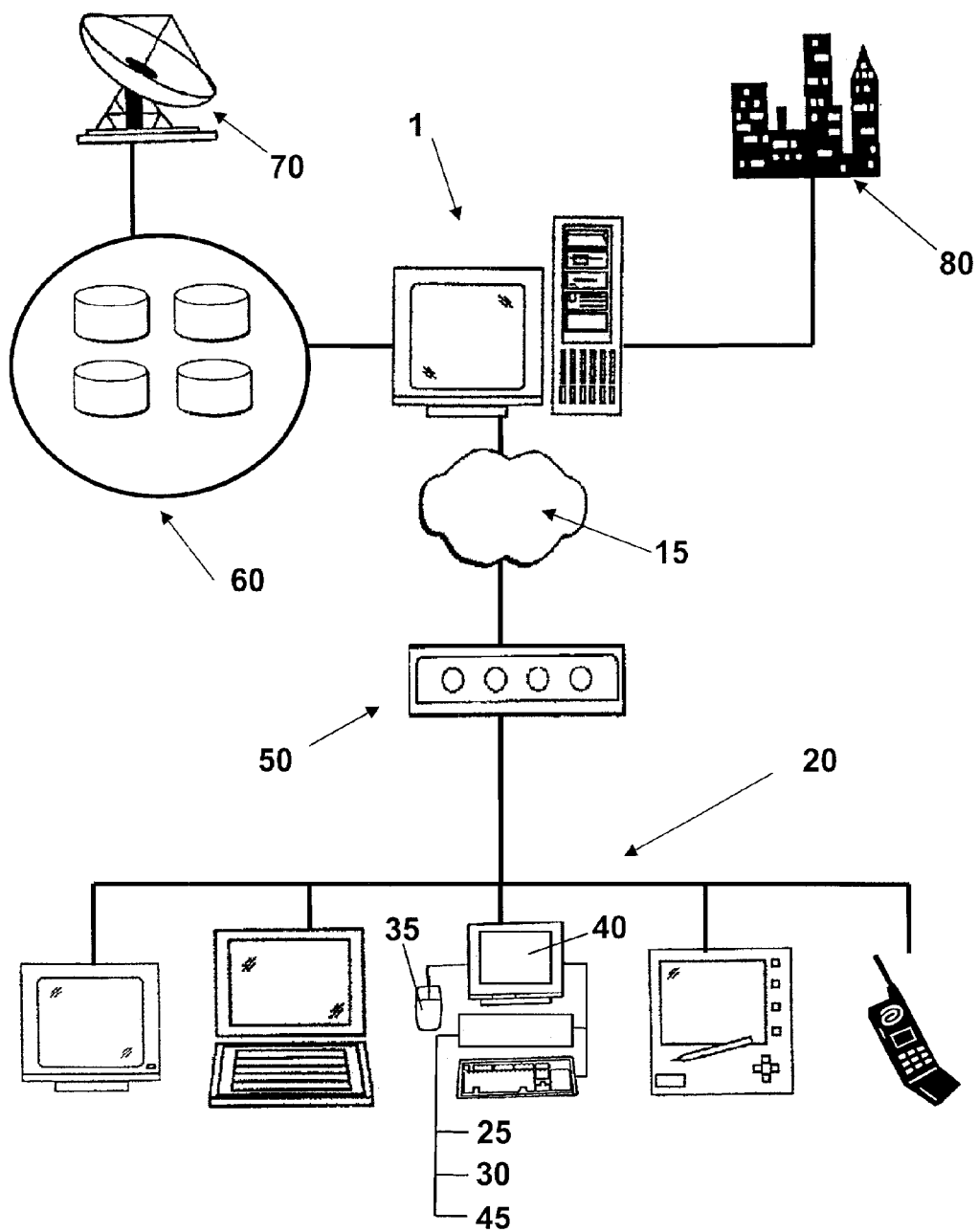
FIG. 1 shows a block diagram of a trading system according to an embodiment of the present invention.

Referring first to FIG. 1, a computerized system 10 is employed to provide the electronic infrastructure for an automated embodiment of the device of the present invention. A host computer 1 is linked by a network 15 to numerous remote client devices 20 such that together they take advantage of the network's broad-based communications capability for having one or more remote machines communicate with and transfer information and related data to and from the host computer 1, server, mainframe, minicomputer or related central machine. In one form, the network 15 can be a direct, dedicated connection between the host computer 1 and one or more remote client devices 20. Preferably, the dedicated connection provides high-bandwidth, such as can be found in T1 lines, Ethernet lines or local networks. In another form, the network 15 can be the internet generally and the World Wide Web, or more concisely, the web, specifically. In either configuration, such a distributed approach allows any number of traders to simultaneously connect to the host computer 1 to enable real-time trading. It also enables the traders to exercise control from a location convenient to the trader, regardless of the physical situs of the host computer 1, communication link (such as network 15) or other components of system 10. In such a way, a user can control the transmission of information originated at remote client device 20 and benefit from the exchange of information with host computer 1 as long as communication between the remote client device 20 and host computer 1 is available. In one form, either or both of the host computer 1 and the remote client device 20 may be general purpose digital computers that can be suitably programmed to accomplish the trades and listing of available trades discussed herein. In the present disclosure, remote client device 20 may also be referred to as a remote client computer, or more simply a computer; the degree of specificity will be apparent from the context.

All traders who are connected to the host computer 1 have equal access to order routing (for example, order entry, modification, cancellation, confirmation, fill and related management), market data and other information relating to trading the futures contracts discussed herein. The real-time availability of market data and related information gives each trader the ability to quickly ascertain market movements. Relevant information can include, but is not limited to, the current trading price of the contracts then offered, as well as volume of trades relating to a particular non-rival athletic program within a particular institution. Connectivity to provide such order routing and market data can be achieved through interfaces between the trading customer and the host computer 1. Such interfaces can use either proprietary or well-known industry standard protocols, such as the Financial Information eXchange (FIX) protocol, or an Application Programming Interface (API).

The host computer 1 can be set up to conduct the same administrative functions normally performed by a conventional floor-trading exchange, including taking trade orders, matching competing trades, providing current trading information to all participating traders, ensuring the security and integrity of the trades as well as maintaining a proper accounting of positions and to what accounts corresponding debits and credits should be placed in to ensure prompt and accurate clearing and settlement of all trading contracts in the system 10. One attribute of the system 10 is that by its automated operation, it does not interfere with the natural operation of the market. Thus, outside of a minimum and maximum contract value, it is solely the marketplace made up of the connected traders that determines price movements of the contracts being traded, not the system 10 or its operator. What control the operator does have is preferably limited to the aforementioned security, administration and trading protocols, all of which can be implemented through trading software (also known as a trading application). Likewise, trading and accounts can be set up so that the traders may maintain their anonymity, or be known to other traders.

Preferably, system 10 includes redundancy to ensure uninterrupted operation. Examples include distributed processing and computation capability, redundant software implementation, database rollback schemes (a statement in SQL where proposed changes in a pending database transaction are cancelled) and other methods known to those skilled in the art. In addition, the system 10 is scalable, including high throughput (i.e., bandwidth) communications links and additional processors to handle increases in trading load. The system 10 also includes security and data integrity features that control access to the system 10, as well as perform authentication and verification of trading transactions. It will be appreciated that existing conventional authentication methods could be used to promote accurate, secure operation. Such security measures also can be used to monitor fund activity (for example, deposits and withdrawals) within traders' accounts. Furthermore, built-in third party operations and automated systems can be employed, including those for verification, authentication and fulfillment of credit card and related transactions. Encryption protocols and software, for example, secure shell (SSH), secure sockets layer (SSL) and transport layer security (TLS) can be used in conjunction with a multiplicity of trader verification steps by the host computer 1 to promote security for the trade orders between the host computer 1 and the remote client device 20 of the subscribing trader. As will be described in more detail below, additional security is ensured through the use of unique trader identifiers known only to the system 10 and the individual trader.

Those skilled in the art will appreciate that alternative hardware environments may be used without departing from the scope of the present invention, and as such, the precise configuration of the system 10 presently depicted in FIG. 1 is not intended to limit the present invention. As will be further understood by those skilled in the art, the term "network" may encompass various forms of connectivity between two or more machines, including point-to-point, shared, dedicated, intermittent or the like. The terms "network", "web" and "internet" are understood by those skilled in the art as being possessive of particular attributes that distinguish each from the other. For example, the web is more precisely thought of as a subset of internet sites. Nevertheless, each of these terms may be used interchangeably in the present context to convey the necessary host and client connectivity unless specifically noted.

The web is a hypertext-based system. In that way, it can use its hypertext protocols and language on network 15 to facilitate communication between a server (e.g., the host computer 1) and a client (such as the remote client device 20). Hypertext markup language (HTML) is the language used by web servers to create and connect documents that contain network addresses called hyperlinks, which allow a user to navigate through a web site. For example, HTML functions as a mark-up language that breaks the document into syntactic portions that specify layout and contents. As will additionally be understood by those skilled in the art, the web and other network connections may be through either a wired or wireless configuration, the latter in the form of radio-frequency (RF) or related waves across the electromagnetic spectrum. One particular form of wireless connectivity can be in the form of a satellite-based system 70 that can relay data worldwide, employing laser or related optical or electronic carriers. Particular forms of wired communication configurations include conventional telephone lines, as well as co-axial cable, fiber-optic bundles or the like. A market data feed 80 can be used to provide up-to-date information related to the market, various institutions and their athletic or educational programs, or other information (such as streaming quote information) that may be of interest to a trader. Market data feed 80 can be provided to host computer 1 by satellite 70, the internet or any other communication link known to those skilled in the art. Moreover, market data can be disseminated by the host computer 1 to remote users through various channels, including the operator of the host computer 1, trading software 45C, third-party trading application programs, quote vendors or the like. Such information updates are compatible with either electronic trading or open-outcry trading configurations.

Connection between the remote client devices 20 and the host computer 1 within the network 15 may be made using any suitable network interconnection rules, a commonly-used example of which is the TCP/IP protocol for transmitting packets of data over a wide or local area network, where the latter may be a node within the former. TCP/IP is a popular internet protocol because it provides file transfer, electronic mail and remote log-in capability for large numbers of host and client systems. TCP is often used in conjunction with a file transfer protocol (FTP) to transfer files between computers linked together by the internet. Arbitration between computers can take place through various systems known to those skilled in the art, such as a Token Ring or Ethernet. TCP/IP is configured to run on top of these protocols.

The remote client devices 20 may be in the form of a computer, personal digital assistant, telephone (including cellular phones), touch screen, pager or other device suitably-configured to communicate with the host computer 1. When the remote client device 20 is in the form of a computer, it may include a microprocessor 25, a memory storage device (also referred to simply as memory) 30 (including volatile random access memory (RAM) and nonvolatile read-only memory (ROM)), an input 35 (such as a mouse, keyboard or voice recognition system), an output 40 (such as a monitor or related display), as well as software (also referred to as programs or applications) 45 to facilitate cooperation between the various computer components, as well as between different devices within the system 10. Throughout the remainder of this disclosure, references to computer 20 are meant to cover the particular embodiment of remote client device 20, yet will be considered to encompass the other forms of remote devices shown in FIG. 1. Thus, any electronic device that accepts structured input, processes it according to prescribed rules and produces the results of that processed input as output would qualify as a computer in the present disclosure. Such interpretation is consistent with the von Neumann architecture of a computer, which includes an input, output, memory, arithmetic logic unit (for example, the aforementioned microprocessor) and a central control unit to orchestrate operations. In this context, the personal digital assistant, telephone, pager or related devices discussed above could be configured to operate as a rudimentary computer, and as such would be within the scope of that term's present definition. The computer 20 may also include communication hardware 50 for supporting the transfer of data between it and the host computer 1.

Software 45 comes in various forms, including operating system software 45A and application-specific software 45B. An example of the former (such as Microsoft Windows) is that which allows the latter to make use of the input 35, output 40 and other hardware components within the computer 20. Application specific software 45B can run on top of the operating system software 45A, performing functions based on user input. Examples of application specific software 45B include word processing and trading-specific software 45C, the latter of which is of particular interest in the present context. Application specific software 45B used for receiving and transmitting data can be loaded into one or both of the host computer 1 and the computer 20. Software 45 may include web-browsing capability (called browser software) as either operating system software 45A or application specific software 45B. One popular example is Microsoft's Internet Explorer.

To meet technology needs, the trading software 45C of the present invention can be configured as a stand-alone (i.e., autonomous) system, or could be coupled to other presently-available commercial systems, of which there are numerous examples, such as the on Exchange Extensible Clearing System, owned by The Clearing Corporation of Chicago, Ill., or X_Trader®, owned by Trading Technologies International of Chicago, Ill., The Chicago Mercantile Exchange's Globex® Trading System, Electronic Broking Services ("EBS"), or many other such systems, any of which can be implemented on host computer 1. In either event, it will be appreciated by those skilled in the programming art that trading software 45C be configured to facilitate trading between host computer 1 and remote client device 20 in a manner consistent with the principles of operation disclosed herein. Furthermore, it is well within the skill of a programmer in the trading art to create the necessary software 45C to accomplish the required listing, trading and record-keeping calculations. In addition, trading software 45C can be provided on any computer readable medium, such as the memory storage device 30 discussed above, as well as on portable storage, such as compact disks, floppy disks, tape, flash memory or the like. It will be appreciated that the trading software 45C can be configured to facilitate the trading of the novel options and futures contracts associated with the production of educational athletics. Accordingly, the invention disclosed is not limited to any specific embodiment of the computer programs (including trading software 45C) disclosed herein.

Connection between trading software 45C and a commercial electronic trading system such as those discussed above can be through means known to those skilled in the art, including internet connectivity or direct connectivity, the latter through such approaches as a T1 line, Ethernet connection, hybrid or other high-bandwidth line. Preferably, in situations where the trading software 45C is being used as a front-end system with a larger electronic trading system, the two are fully compatible with one another so that, among other things, proper order entry and cancellation is ensured (as well as verification of same), proper connectivity, login, message sequencing is ensured, all critical market data and related information be received and displayed, be readily upgradable based on trading needs or changes in market conditions, and avoid disruptions to other markets that may be running simultaneously on the electronic trading system. An electronic trading system platform can be of either an open or closed architecture, where the former would enable ease of access to individual forms of trading software 45, including situations where the trading software 45C is proprietary. Since such systems are well known in the art, they will not be discussed in further detail.

In certain architectures, some functions are performed by the host computer 1, while others are performed on the remote computer 20. For example, in the client-server based approach, much of the graphics (and other memory-intensive data) can be pre-stored on the remote client computer 20, thereby allowing the less cumbersome input and requests, as well as host computer 1 response, to proceed at a more rapid pace.

The host computer 1 may be equipped with a web server and appropriate web browser interface, as well as one or more databases 60. As mentioned above, at least one form of software 45 is used for connecting to the web through various components, including a web browser and various servers, especially those for hypertext transfer protocol (HTTP), structured query language (SQL) and file transfer protocol (FTP), as well as an interpreter for script (such as Javascript). HTTP is the protocol used by the servers and their clients to communicate using HTML hyperlinks that upon clicking execute the hyperlink to retrieve the linked information. SQL is a popular language used to create, modify and retrieve tabular data (such as that used in relational database management systems). The HTTP server establishes and manages the connection to the internet as one form of network 15, as well as maintain a web site. Pages used to convey the information may be written in conventional internet-compatible languages, such as extensible markup language (XML), standard generalized markup language (SGML), virtual reality markup language (VRML) or the aforementioned HTML. Web-accessible information is available between connected machines, and is identified by a uniform resource locator (URL) that specifies the location of a file containing such information in terms of a specific computer and a location on that computer. Any computer with an internet protocol (IP) address that is connected to the internet can access one or more files of web-accessible information by invoking the proper communication protocol and specifying the URL.

In one embodiment, computer 20 can be equipped to process Java or related machine-independent script instructions to facilitate the display of moving animation and related dynamic information. In addition, software components referred to as applets can be encoded in the script to interact with the trader locally to perform a specific function on the client computer 20. These applets are transferred to the web browser that is loaded on computer 20 along with other web page information to be executed by the interpreter. These applets can further cause the web browser to retrieve information via hypertext links, thus data acted upon by the applet can be located on the same or a different web page (and even on a different server entirely). At the beginning of each trading session, trading software 45C is preferably transmitted to or activated by each subscribing trader; in the case of the former, it is transmitted by the host computer 1 in the form of a feature-rich applet. The trading software 45C enables the trader to display graphical user interface (GUI) screens such as those shown in FIGS. 3A through 3L on display 40; the trader may navigate through them using a mouse 35 or other conventional pointing device. Such device may be used to click on various HTML icons, as well as allow input into various fields information germane to a particular trade or the trader's account. Thus, by using these interactive locations displayed on these GUI screens, traders may submit dynamically written queries to data tables maintained by the host computer 1.

Programs such as that used to facilitate the present trading system may be provided by the host computer 1 upon an appropriate log-in sequence by a user of the computer 20 or as part of a downloadable package that is provided to the user once that user subscribes to exchange of the present invention. Such programs can be written in any well-known internet-compatible language, such as Dynamic HTML, Active X, or the aforementioned Java. These languages allow internet publishers to create complex multimedia web pages of text, graphics, tables, buttons, images, sounds and videos each identified by an HTML tag that define the above-mentioned functions. Possible trader interfaces may include HTML pages, Java applets and servlets, Java or Active Server pages, or other forms of network-based GUIs known to those of skill in the art. In one example, traders connected through the internet can submit HTML requests via Java Remote Method Invocation (RMI), a Java application programming interface for performing remote procedure calls, or Internet Inter-Orb Protocol (IIOP), an implementation of the more abstract Global Internet Inter-Orb Protocol (GIOP). Both RMI and IIOP can run on top of the standard TCP/IP protocol.

In operation, the remote client computer 20, in response to instruction from trader input, executes a buy or sell order by communicating the trader's input with host computer 1. Display 40 is configured to show data from database 60 in graphical or related user-friendly format. Database 60 may be situated in memory 30, or may be intermittently fed to host computer 1 or remote client computer 20 through periodic updates from a data and information service, such as a trading information service or the like. The host computer 1 includes (in addition to many of the attributes previously discussed in conjunction with the remote client computer 20 above) the ability to send, receive and operate on information contained in databases 60; such information may include contract identifier information (for example, the name of the non-rival athletic program contract within a particular educational institution being traded), price, quantity presently available on the exchange, news or other such information that a trader may find useful. The software 45 resident on or otherwise used by host computer 1 may be similar to, or have different features from, the software 45 of the remote client computer 20, so long as communication and trade execution between the host computer 1 and remote client computers 20 are not adversely impacted.

Trading software 45C can, among other things, manage individual trader accounts, receive trader input, match bids between traders, then execute, clear and settle all trades. The trading software 45C may also include security measures to ensure that all transactions are protected. In one form, the trading software 45C may be executed by the host computer 1, although in alternative embodiments, such software may also be executed on the remote client computer 20. The databases 60 can be utilized to reproduce the information available in a traditional floor-trading system, as well as to maintain dynamically updated information of all pertinent trading information and data on an individual institution's non-rival athletic program. Additional updated information on exchange subscribers and their accounts, as well as a history of all bids (including quantity, price, date and time of receipt, trader identification, and trade status) may also be maintained by the host computer 1. The software 45C may also process data from individual or aggregate trading activity in the system 10 to provide other information that a trader may find useful, including contract volume, past and current market and contract history, as well as market concentration and volatility.

Trading software 45C may include an applet that has means for accepting and verifying user input, and means for transmitting that user input to the host computer 1, enabling the user to engage in trading activities. Such input may include logging onto the system 10, navigating a web site through HTML page requests, viewing market data and news, making trades on futures contracts and monitoring an investment. This, coupled with all of the aforementioned security, accounting and related functions allows trading software 45C to be configured to handle most, if not all, of the trader's needs. Thus, for internet-based access and trading, the only application software 45B (besides trading software 45C) needed on the computer 20 is a conventional web browser, although it will be appreciated that other software (such as operating system software 45A) is typically also present.

Some of the electronic or screen-based commodity trading systems in use today require a broker, specialist, telephone operator or other intermediary between the trader and the trading floor, while others are fully automated so that traders can complete a trade without the need for such intermediaries. Either form is compatible with the system and method of the present invention, although the fully automated approach has the potential to reduce the likelihood of human error or abusive trading practices in the execution, clearing and settlement of trades. Likewise, an automated system advantageously allows for automated record-keeping.

Figure 2:
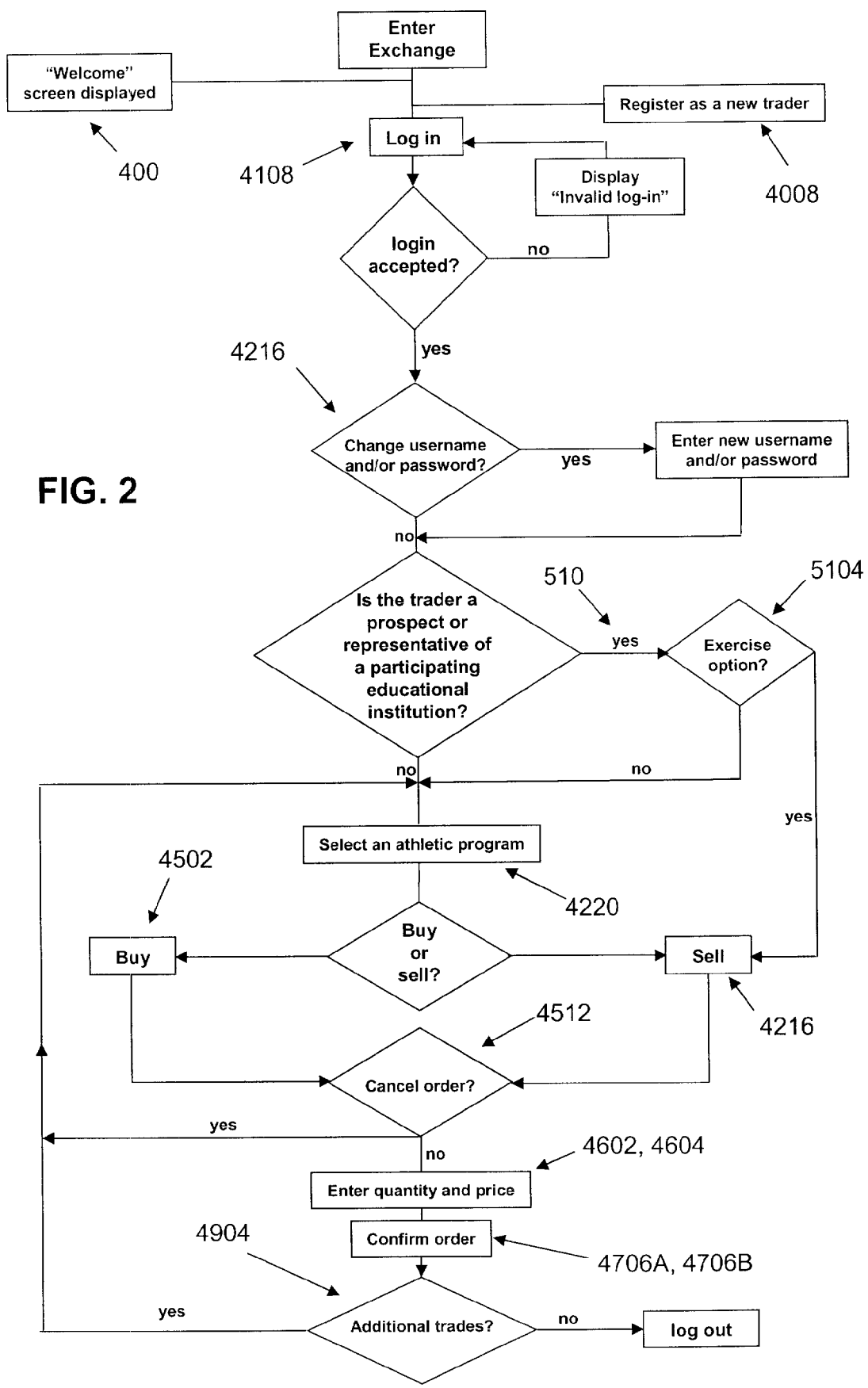
FIG. 2 shows a flowchart with a sequence of steps that may be executed in conjunction with the system of FIG. 1 in order to trade novel options and futures contracts.
Figure 3A:
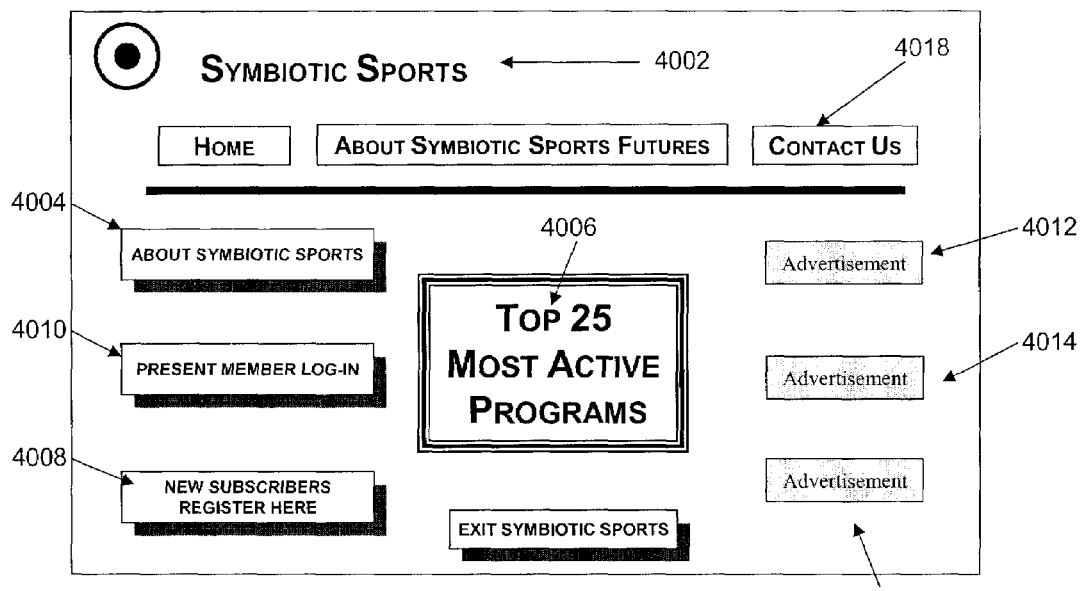
FIG. 3A shows a welcome screen for an exchange corresponding to an embodiment of the present invention.

Referring next to FIG. 3A in conjunction with FIGS. 1 and 2, when a user first connects to the host computer 1 of system 10, a welcome screen 400 shows up on display 40 of computer 20, revealing a banner 4002 and numerous icons (or buttons) in the form of HTML links, including one 4004 that can describe the basic services offered by the present exchange, one that will lead to a current list of the most active (i.e., most widely-traded) contracts 4006, as well as new subscriber (i.e., member) registration 4008 and present member log-in 4010. For example, if a user wants to find out which institutions' non-rival athletic programs have been the most actively traded, he or she clicks on the icon 4006, which routes the user to the appropriate screen as described in more detail below. HTML links 4012, 4014 and 4016 may also be used for various commercial entities that purchase advertising space that appears on the screen 400. Additional icons 4018 can also be used to provide information regarding contacting the operators of the exchange, explanation of non-rival athletic program commodities, a homepage or the like. It will be appreciated by those skilled in the art that the precise arrangement of icons on the screens can be varied, according to aesthetic or functional needs. For example, in an alternate version, the screens can include fewer icons to present simplified choices for the trader.

Figure 3B:
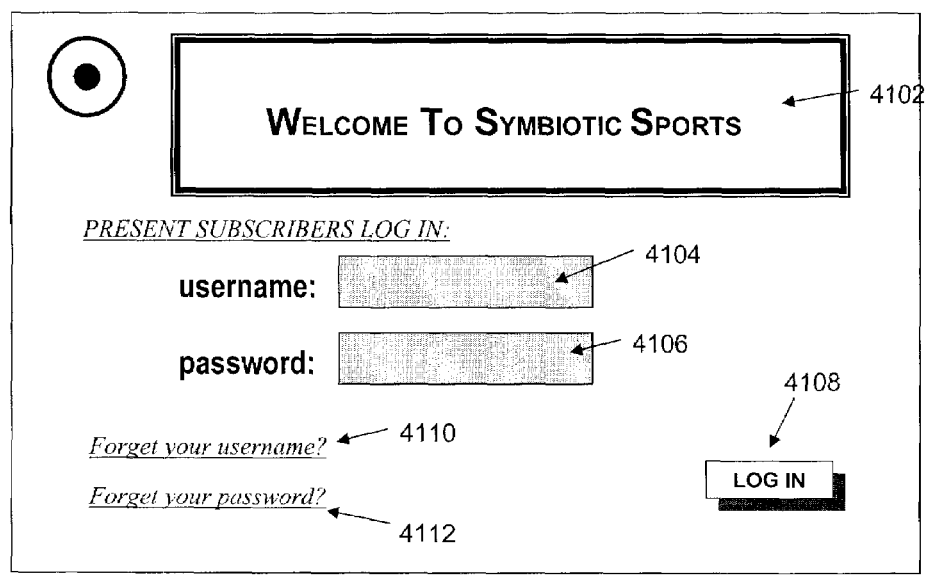
FIG. 3B shows a log-in screen for entrance into an individual trader account.

By clicking on the present member log-in icon 4010, the trader is routed to a log-in screen 410. Some of the screens (including screen 410) contain interactive fields that allow the input of user-specific information into computer 20. Screens with fields for input are referred to as form pages, where the input fields enable information to be sent to an HTTP server for further action. Referring next to FIG. 3B, screen 410 includes, in addition to a banner 4102 which may or may not be generally similar to that of welcome screen 400, fields 4104, 4106 where the subscribing trader can provide an identifying username and password, then click on the log-in icon 4108. This instructs the browser to post the information contained in the fields back to the HTTP server, which analyses the incoming data and looks for information to instruct it how to deal with the trader's request. The HTTP server passes a script file (not shown) from the HTML page to a script interpreter, which extracts input tag information and forwards it to the program instructed by the script file. By way of example, the script file may instruct the script interpreter to have the SQL server write the passed information to a database stored on the local memory storage device 30. The script file could further instruct the script interpreter to request information from the database, in which case the SQL server extracts the requested information and then passes it back to the HTTP server for use by the web browser.

If the trader has forgotten his or her password or username, he or she can click on the links 4110, 4112, which will redirect the trader to another screen (not shown), where the trader will be queried to provide secret information (such as a social security number in conjunction with a mother's maiden name or the like, based on an earlier question provided during registration), after which the host computer 1 will mail back a new username and/or password to the e-mail address provided in the user's registration database. Prospective (i.e., new) members may register on-line for the service provided by the present invention by clicking on an icon 4008 which will reroute the user to one or more registration screens (not shown), which may query the registrant for information that will be used to set up a new account. Part of the registration process includes the registrant choosing a unique username and password, both of which will be used for subsequent log-in after registration.

By providing an e-mail address, the registrant can receive additional registration and related instructional information. The registrant will have the option of funding the account on-line, or through various conventional ways (such as check, wire transfer, money order or the like). Once the registrant receives a password and has appropriately funded the account, he or she may begin trading up to the amount of such funding.

Figure 3C:
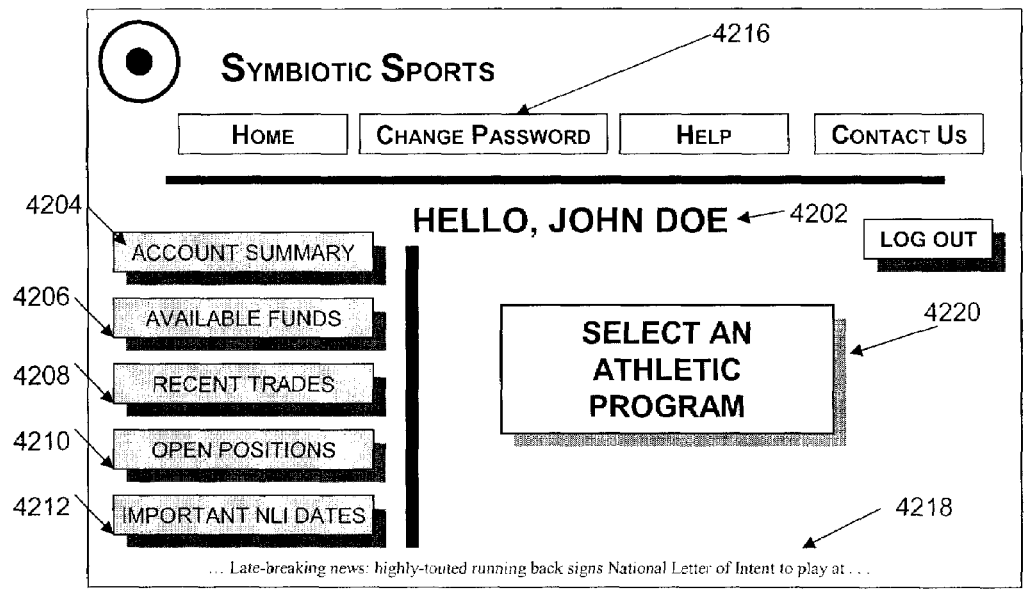
FIG. 3C shows the home screen of a registered trader that successfully logged-in from the screen of FIG. 3B.
Figure 3D:
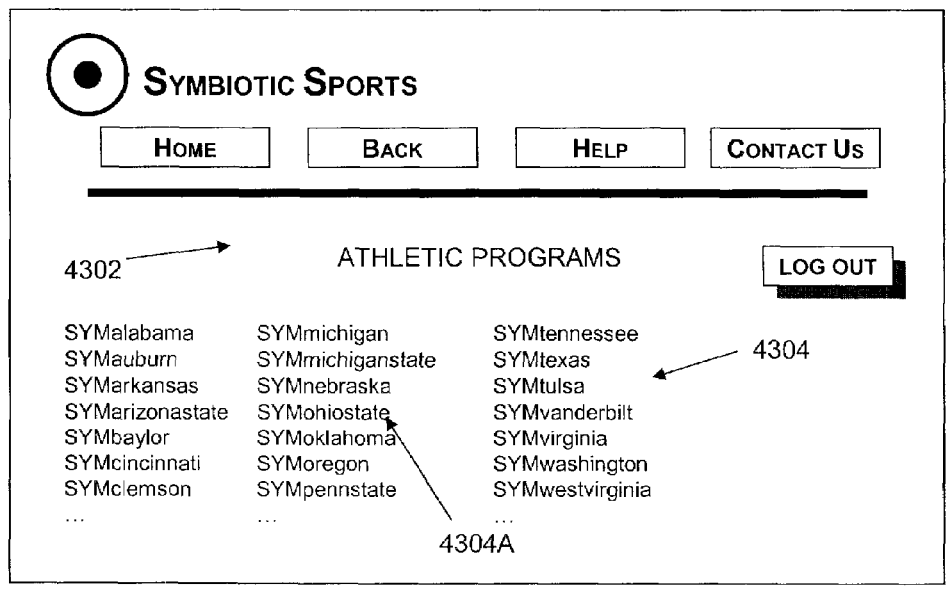
FIG. 3D shows a screen highlighting trading choices of educational institutions that participate in futures trading on the exchange of FIG. 1.

Referring next to FIG. 3C in conjunction with FIG. 2, once the trader is logged-in as an authorized user, he or she is greeted with a home screen 420 that identifies the trader by name 4202 that was provided during registration. Furthermore, once the trader username and password have been verified by the host computer 1 as identifying a subscribing trader, the host computer 1 transmits for viewing on the display 40 the trader's personal account information obtained from database 60. Such information could be displayed directly on screen 420, or can be accessed by clicking on one or more icons, such as icon 4204, 4206, 4208 or 4210. By having the trader be properly logged-in and verified, all subsequent transaction data transmitted back and forth between the host computer 1 and the logged-in remote client device 20 is associated with that unique trader. Authentication devices, such as cookies residing in the remote client device's 20 HTTP browser (which can be transmitted to the HTTP server of host computer 1) may also be employed to ensure security. Such a system of identification and security allows the system 10 to reliably identify data inputs that are have been generated by a unique and approved subscribing trader.

Icons near the top of the screen 420 can be used to provide general information. For example, if the member is desirous of changing password, he or she can click on the change password icon 4216, which will lead to another screen (not shown) with another set of instructions. It will be appreciated that features such as the change password icon 4216 could be placed in other suitable locations, as well as on other screens. In addition to the screen 420 displaying the trader's personal account summary 4204, available funds 4206, recent trades 4208, open (i.e., unfulfilled) contracts 4210 and important dates relating to the NLI process 4212 for various sports, it has an icon 4220 that allows the trader to select a particular educational institution in which he or she may be interested in trading. Such choice sends the trader to screen 430, discussed in more detail below. Optionally, screen 420 can include updates to one or more non-rival athletic programs of particular interest to a trader. Such information can be in the form of a moving ticker or banner 4218 that scrolls across the bottom of the trader's screen 420. Thus, for example, if a trader who is an Ohio State fan wants to keep tabs on futures trading of Michigan's non-rival athletic program, he or she can enter such target programs in another screen (not shown); the exchange will store this information in database 60, or can retrieve it from another source, such as market data feed 80, and will automatically forward information pertaining to $SYM_{MICHIGAN}$ to the trader's screen 420. Those skilled in the art will appreciate that such information can be provided continuously, or as important triggering events occur.

It will be appreciated by those skilled in the art that selection of a particular non-rival athletic program through icon 4220 can proceed in any order. Once the non-rival athletic program icon 4220 is selected, the trader is routed to screen 430, which is shown with particularity in FIG. 3D. A banner 4302 indicates to the trader that a list of all the non-rival athletic programs that have futures contracts available for trading. From this list or field 4304 (which includes HTML features), a particular non-rival athletic program 4304A may be selected merely by clicking on the name of the desired program. In the event the trader does not know the name of the program, a search aide icon (not shown), which may be based on a program name, state, city or the like, may be included.

Figure 3E:
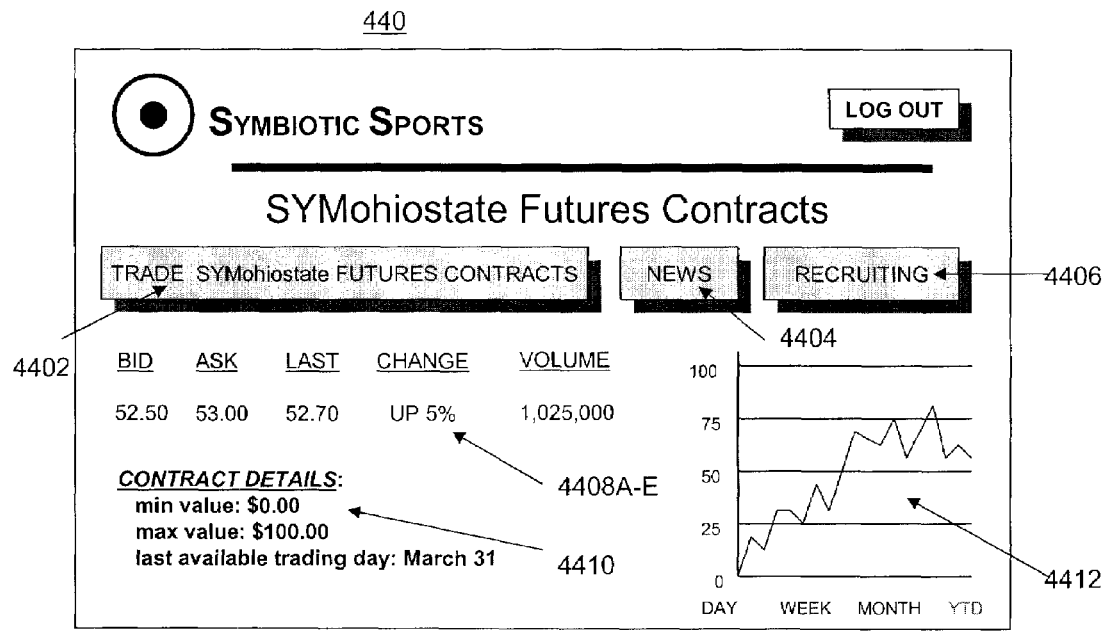
FIG. 3E shows a screen highlighting a particular educational institution chosen in FIG. 3D.

By selecting the name of a particular non-rival athletic program 4304A from screen 430, the trader is routed to screen 440, as shown with particularity in FIG. 3E. In addition to a trading icon 4402, icons 4404 and 4406 that are unique to the non-rival athletic program chosen from screen 430 can be selected, so that the trader can get publicly available news, statistics, schedules, recruiting or related information that the trader may find useful. With regard to the chosen non-rival athletic program (again, $SYM_{OHIOSTATE}$ in this example), other information, such as that shown in fields 4408A-E give the trader the most up-to-date information on what the current bid and ask price, as well as last price, change and cumulative volume (which can be measured in any convenient metric, such as total dollar value or the total number of futures contracts of all traded $SYM_{OHIOSTATE}$ contracts in the current period) can also be shown. As with other information provided to the trader from the exchange, the trading information of fields 4408A through 4408E is updated periodically (for example, continuously to ensure real-time or near real-time delivery), based on input from the market data feed 80 or database 60. Details pertaining to futures contracts can be displayed in field 4410, including the date that the contracts expire. An overview of a trading histogram 4412 may also be shown, covering a length of time (for example, day, week, month or season-to-date) chosen by the trader.

Figure 3F:
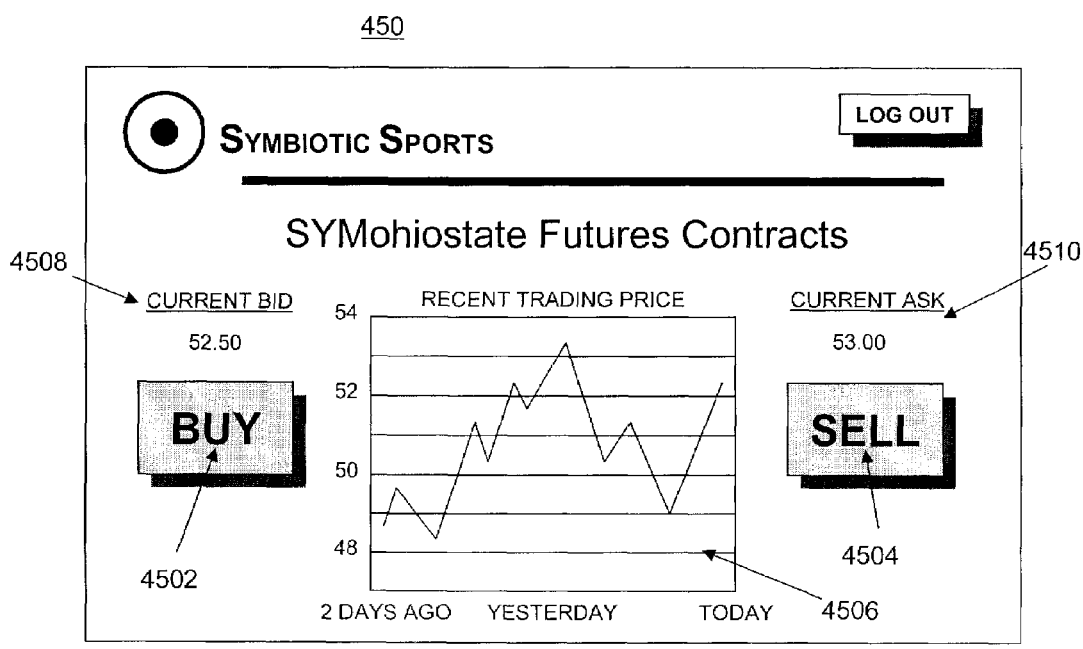
FIG. 3F shows an active trading screen with available trading choices that appears when a trader hits the trade icon of FIG. 3E.

By clicking on the trade icon 4402, the trader instructs the exchange to proceed to the trading screen 450. Referring with particularity to FIG. 3F in conjunction with FIG. 2, the user may buy or sell non-rival athletic program futures by clicking on the appropriate icon 4502, 4504. To help the trader quickly ascertain the price status of the program at issue, fields 4508 and 4510 show the current bid and ask values, respectively. A histogram 4506 depicting price fluctuations over a recent period can additionally be used to inform the trader. As trades are made, the screen of each logged-in trader can be continually updated (for example, at preset intervals, or upon a preset or otherwise significant change in a particular program's price or other measurable parameters), thereby enabling each trader to make further trading decisions based on up-to-the-minute information regarding current contract prices and trade volume. The status of an open contract can be updated automatically (through for example periodic automated updates sent from host computer 1), including volumes and prices, as well as trends to help keep a trader informed. Subscribing traders also have the option of submitting dynamic queries to the host computer 1 at any time.

If the trader is interested in buying futures contracts on the institution (again, using $SYM_{OHIOSTATE}$ as the example), he or she clicks on the buy icon 4502. When this happens, the exchange sends the trader to screen 460, which is shown with particularity in FIG. 3G. This screen gives the trader the opportunity to input desired price and number of contracts in fields 4602 and 4604, subject to funding availability as previously discussed. Once these values are entered, the submit icon 4606 is clicked. This directs the trader to a verification screen 470, shown with particularity in FIG. 3H, that asks the trader to verify the price and quantity of futures contract that were entered from the previous screen 460. In addition, the exchange is checking the trader's account for an adequate deposit in his or her account to enable the requested trade. If the trader's funds are insufficient, a message can be sent from the host computer 1 to the remote client device 20 altering the trader of the shortage. In addition, immediately upon receiving an order and entering it into the database 60, the host computer 1 sets up a reserve against each new order. This reserve can be in the form of a deposit placed in the trader's account. Furthermore, the host computer 1 can update each trader's account upon the occurrence of any action against that trader's account. In such way, the host computer 1 will not perform any trade that would cause a trader's account to become overdrawn, thereby eliminating a major source of account errors. If the values shown in fields 4702 and 4704 are in agreement with the trader's expectations, the trader clicks an appropriate verification icon 4706A, which then sends the trader to screen 480. If the values displayed are not in accordance with the trader's expectations, icon 4706B can be pushed, thereby sending the trader back to the input fields 4602, 4604 of screen 460.

Figure 3I:
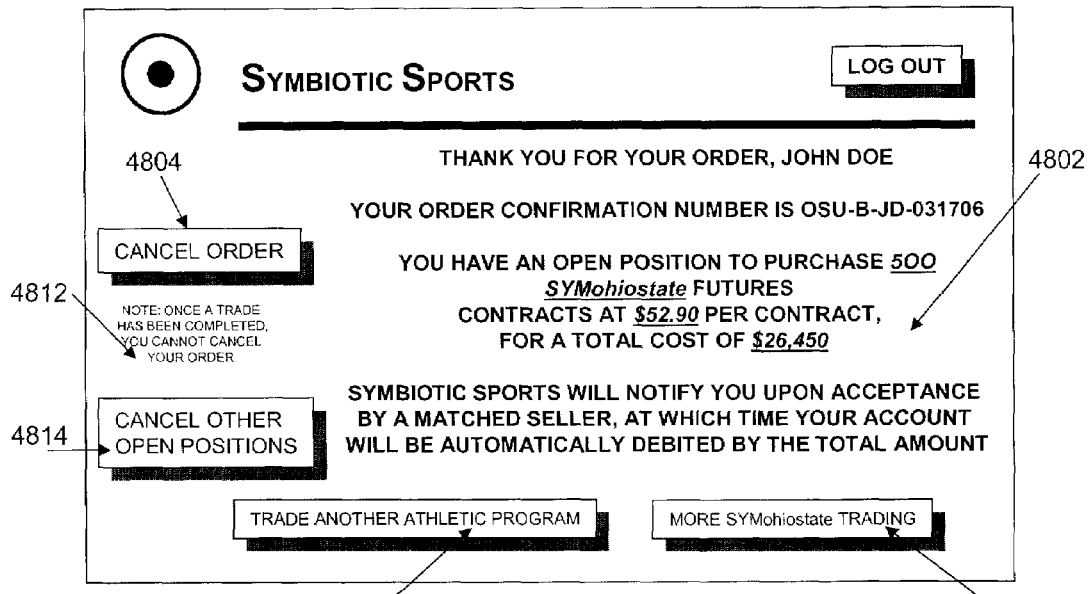
FIG. 3I shows a confirmation of receipt of an order placed by the trader in FIG. 3H, including additional trading options.

If the displayed information is correct, and the trader clicks on icon 4706A, the trader is forwarded to screen 480, shown with particularity in FIG. 3I. The trader receives confirmation of a placed order on screen 480, with indication of the name, number and price of contracts bought or sold. Icon 4804 gives the trader the option of instantly cancelling the just-placed order, as long as it has not been accepted, as indicated by notice 4812. As stated before, there are various ways of facilitating the trade. For example, trading can occur in either a bid-matching exchange format or a variation of a pari-mutuel format, where the following discussion is based on a bid-matching form of exchange. The host computer 1 processes the trader's order by placing it in memory, such as that of memory storage device 30. The order is a data structure that may include, among other things, a trader's name, account number, time and date of the order, nature of the contracts bought or sold, and cash balance in the account. An icon 4814 for cancelling open contracts can be clicked; this opens a dialog box (not shown) that contains a listing of that trader's active contracts, as well as the ability to pick and choose (such as by clicking or otherwise highlighting) what trades to cancel. As with buying contracts, cancellation of a presently open position requires a verification step somewhat analogous to what was previously described. Upon the confirmation of the trader's order, the transaction data is compiled and transmitted to the host computer 1, preferably using the aforementioned encryption means. Upon submission of the original order by the remote client device 20, the exchange reserves or withdraws from the trader's account the funds that would be needed to finalize a trade based on the order.

Once the trader's order has been placed, the exchange searches the database 60 for any reciprocal open contract. As stated above, in one form, database 60 may reside in memory storage device 30. The database includes a comprehensive, dynamically updated listing of all orders placed in the system, including price, quantity, when placed, trader and order identification, and bid status. In one form, records of trades in database 60 can be in the form of a lookup table. The exchange creates a new record, assigning it a time-stamp and an open (i.e., unfulfilled) status identifier to indicate that the order is available to be matched. As indicated by language 4802 on the screen 480, the exchange sends confirmation that the system 10 has entered the submitted order, confirming the values specified by the trader for price and lot size. Additional language indicating that the order is open, and that the trader will receive notification upon completion of the order, is also provided. Icons 4806 and 4808 can be used to allow the trader to proceed with another trade while waiting on the results of the previous trade. For example, icon 4806 can be used to do more trading on the present athletic program (shown as Ohio State in FIG. 3I), while icon 4808 can be used to switch to another institution or athletic program. Thus, in this latter case, by clicking on icon 4808 the trader could be rerouted to list or field 4304 of FIG. 3D, while in the former, by clicking on icon 4806 the trader could be rerouted to screen 440 shown in FIG. 3E.

Returning again to FIG. 3F, if the user wishes to sell a futures contract, he or she follows the same procedure discussed above in conjunction with the "buy" transaction, except instead of clicking on the buy icon 4502, he or she clicks on the sell icon 4504. In situations where an investor is attempting to become a market maker, the exchange can check for an adequate deposit to cover the investor's position. The software 45C can be used to run a check against the investor's account to ensure that such deposit is in place. In both the "buy" and "sell" scenarios, security (such as encryption) is preferably incorporated to ensure the integrity of the communication regardless of whether the order is a buy or sell.

In a configuration set up as a first-in, first-out order-matching scheme, the time and price can be made the determining factors. For example, all orders at the same price can be filled according to time priority. It will be appreciated by those skilled in the trading art that other approaches or algorithms may be used. For example, in a market-maker algorithm, where trading liquidity may be enhanced by the presence of a trading concern that can establish and maintain a two-sided market, the concern can be given a guaranteed allocation of any incoming orders in return for complying with market obligations that may be defined by the exchange. In another example, pro rata order matching approaches may be used, where orders are filled in accordance with price priority. In such case, the first order with a price priority will be given matching priority, with all others (at that price) will be at least partially filed, depending on the available quantity of remaining orders.

With particular regard to the first-in, first-out market matching scheme, if the exchange, in searching the database 60 for a match, does locate one or more matching orders, it selects the matching order with the earliest time-stamp. The exchange then compares the orders in database 60 to determine if they specify the same or a different lot size; if the number of contracts specified is the same, the exchange completes the order and sends an indication to the relevant traders that the contract has been filled. If the lot sizes differ, the exchange calculates the difference in lot sizes and matches the trader's order with the available lot number of open and reciprocal contracts. The process can be repeated by searching the opposing orders on a first-come-first-serve basis until a match is found, or until the trader cancels the order. If after a certain period of time no matching order is found, the exchange can optionally proceed to enact a partial fill of the order. This can be done at the trader's request (based on, for example, a query from the host computer 1), or automatically, depending on which option the trader selects during setup (not shown) of his or her account. For example, if an open contract to purchase one hundred futures of $SYM_{OHIOSTATE}$ could be matched with an open contract to sell fifty shares of $SYM_{OHIOSTATE}$ at the same price, the exchange can match the first fifty of the purchaser's contracts with the fifty seller's contracts, thereby completing that contract while leaving the remaining fifty purchaser's contracts for a later match. Thus, where an opposing order is submitted at a complementary price, but for a different number of contract units, a match is preferably still declared, and is effectuated for the lesser of the two numbers of units specified by the two traders. This results in filled contracts for each trader for the lesser number of contracts, as well as an open order for the contract units remaining unfilled. Once any trade has been completed (i.e., fulfilled), the host computer 1 sends confirmation to the remote client device 20, instructing the GUI to show the results of the transaction on the trader's display 40. This confirmation results in a screen display 490, itemizing the number of contracts filled, the price, and the option to trade additional contracts. This is described in more detail next.

Figure 3J:
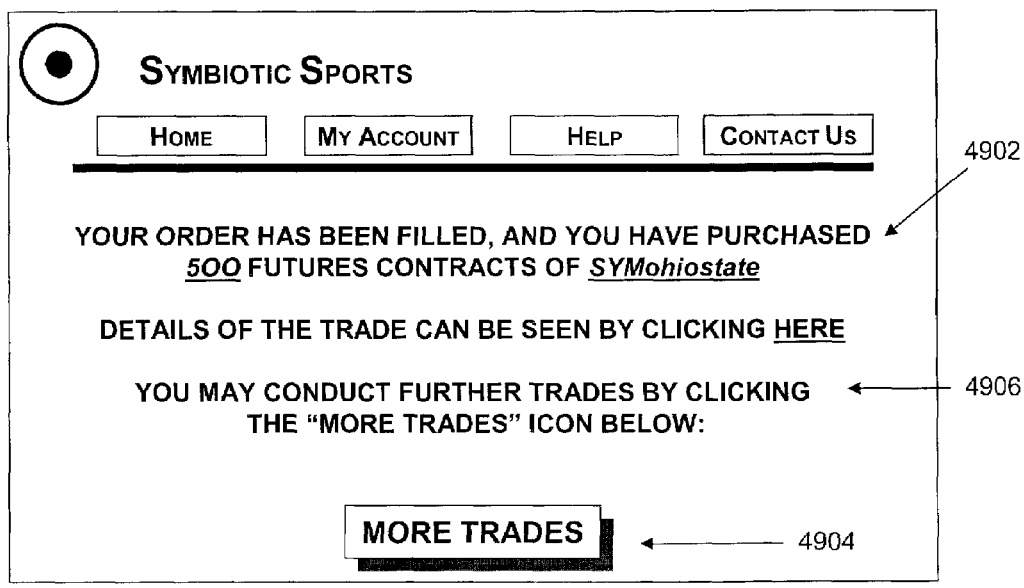
FIG. 3J shows when a contract order placed by the trader in FIG. 3I has been accepted and completed, as well as giving the trader the option of making additional trades.

Referring next to FIG. 3J, whenever a match has been made, the exchange's trading software 45C proceeds to notify the trader of the filled trade, as shown in field 4902. Field 4906 gives the trader the option to look at details related to the trade by clicking on an HTML word, such as the word "HERE" in the field. The exchange automatically performs all clearing and accounting processes needed to complete, guarantee and confirm each trade. The accounting completes the transaction and credits and debits the respective account balances of the traders who are parties to the transaction. The exchange determines whether any portion of the recently filled contracts offset an existing position in that trader's account. The exchange determines the trader's overall position by counting the total number of filled contracts. The exchange determines if the number of filled contracts on both sides are equal, and if so, debits the trader's account in the amount previously reserved for the current order, less the amount allocable to any unfilled contracts still remaining.

If the trader's overall position is not neutral, the exchange determines whether such position shown is offset by an opposing position of the newly filled contract. If the newly filled contract does offset the trader's preexisting position, the number of new contracts filled is subtracted from the open position, and the trader's account record is accordingly updated. In such case, the trader's account is credited by multiplying the contract value by the number of offsetting filled contracts, less the trading fees associated with the filled contracts. Imbalances in traders positions are maintained until offset through additional trading activities or by final settlement at the end of the trading period.

After account balance checks by the host computer 1, the reserves earlier withheld by the host computer 1 from each trader's account are now applied to clear and to settle the trade. Trading fees or commissions are charged at this time to the account of each matched trader according to predetermined contractual terms, and the accounts of the matched traders are debited or credited accordingly. All data pertinent to the trade is recorded by the host computer 1 to database 60. Position and account information are updated to give the trader a complete set of information pertaining to the trade. This can be valuable for record-keeping, as well as indicia of the terms of the trade in the event of any dispute. Screen 490 also includes icon 4904 that allows the trader the option of pursuing additional trades. In this manner, icon 4904 can be made to function similarly to that of icons 4806 or 4808 from screen 480 in FIG. 3I.

By way of recap, one or more traders enter their orders through trading software 45C or related front-end trading application. A submitted order is deemed to be accepted once the software 45C has confirmed order validity, time-stamped the order and sent acknowledgement of the order to the trader. Accepted orders can be kept in a centralized order book (which may also be resident on host computer 1), where an entered order is matched to a complementary order from another trader. Depending on the algorithm making up the software 45C, part or all of the order may be executed in one of the manners discussed above. For example, in situations where orders are not completely executed, the order time-stamp may be used for subsequent order prioritization, if time priority is a factor in the algorithm. Once a trade has been executed, the user receives the contract fill information, which is also sent to a clearing system (which also may be resident on or cooperative with the host computer 1) for post-execution processing.

Figure 3K:
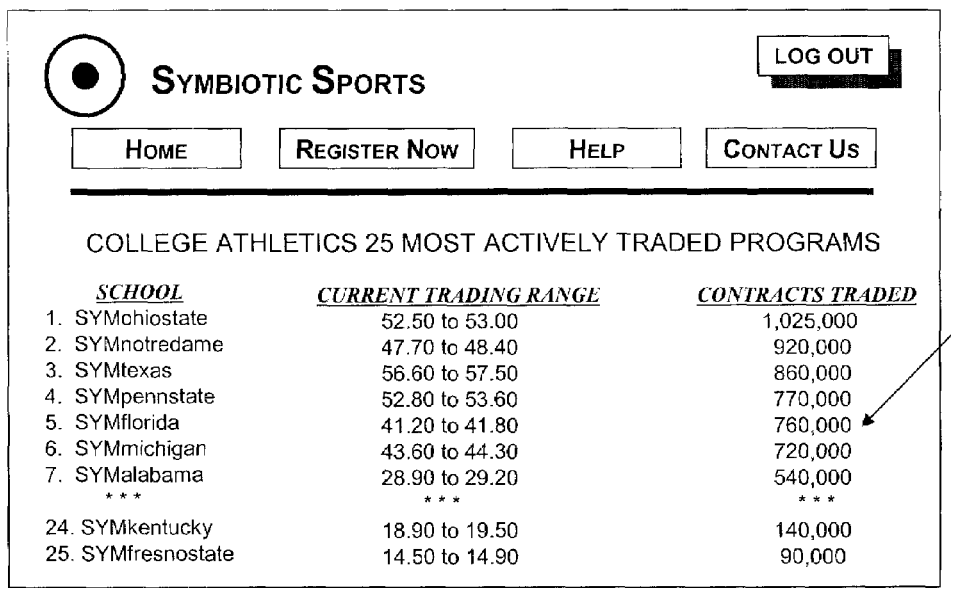
FIG. 3K shows a screen that displays the most traded educational institution futures contracts that a user can access by clicking on the "top 25 most active programs" icon of FIG. 3A.

Referring next to FIG. 3K in conjunction with FIG. 2, an information screen 500 can be used to inform traders of the most actively traded programs, as shown in table 5002. Various forms of information, including the name of the institution, trading price ranges and trading volume and other data may be presented. In addition to providing other icons that allow the viewer to register for an account, ask questions or the like, the data contained in table 5002 can be in HTML form, so that (in the event the viewer is already registered) if the viewer wants to trade on a particular institution's non-rival athletic program, clicking on the appropriate program name makes a direct link to that particular program.

Figure 3L:
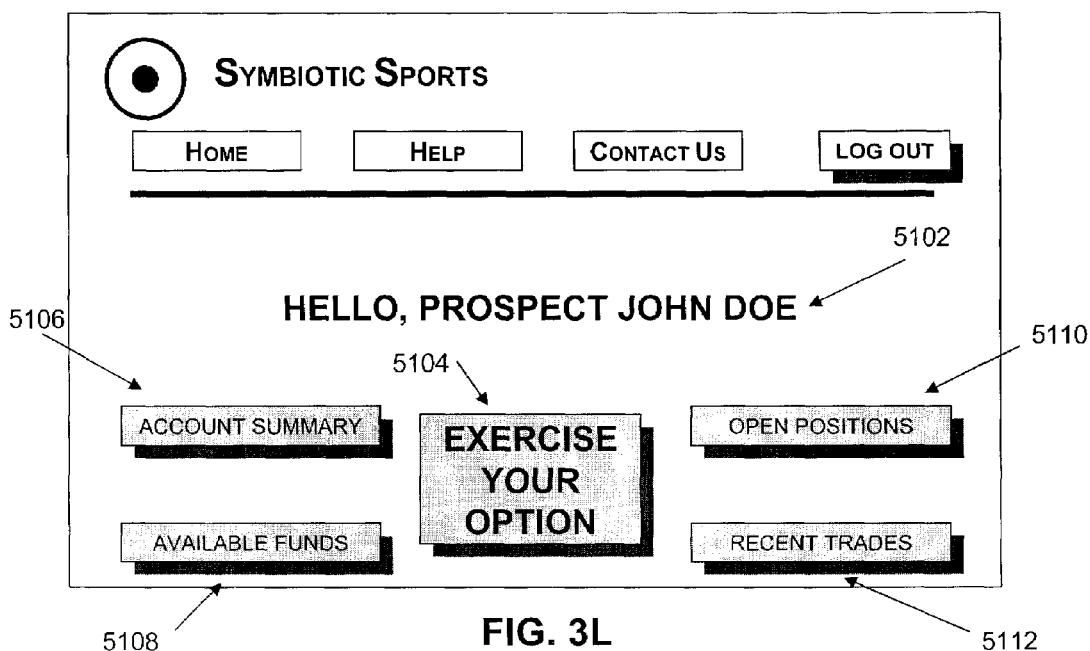
FIG. 3L shows a screen generally similar to that of FIG. 3C, except now tailored for use by a trader who is also a qualified prospect or a trader who represents a qualified educational institution.

Referring next to FIG. 3L in conjunction with FIG. 2, in situations where the trader is also a qualified prospect or a qualified institution, a different screen 510 can be used. As stated before, a prospect or an educational institution may become qualified by entering into a binding agreement (such as an NLI or other contract) with one another. In a manner generally similar to that of screen 420 for other traders, screen 510 identifies qualified prospects and qualified institutions by the name 5102 that was provided during registration. A significant difference over screen 420 is the option icon 5104 that gives the qualified prospect and qualified institution the additional ability to exercise options to buy allotted futures contracts at a predetermined strike price. Once the qualified prospect or qualified institution has paid the option premium (for example, $100) and purchased futures at a fixed strike price (for example, $1), they gain the right to sell some or all of their allotted futures contracts (for example, up to one thousand futures) at the market price, assuming a matching buyer can be found in a bid-matching arrangement. Other icons, including account summary 5106, available funds 5108, open positions 5110 and recent trades 5112 can be used to keep the trading prospect up-to-date on the status of his or her account.

Regardless of how the companion market is structured relative to the primary market, the subscribing trader will be able to use the same exchange through the same interface, performing the same operations and using the same account. In other words, the operation is transparent to the trader, although it will be appreciated by those skilled in the art that minor variations in screen displays to best implement one of the variations discussed above are possible.

Example

The following example can be used in order to better elucidate the concepts of the present invention, using a dual (i.e., primary and companion) market approach. In the example, a first Ohio State fan desires a highly touted football prospect to sign an NLI Commitment with Ohio State and has read on a recruiting web site that the prospect has narrowed his college choices to Ohio State and Michigan. The first Ohio State fan bids $20 for each of fifty SYM$_{OHIOSTATE}$ futures. On this same date, a current Ohio State player, whose position the prospect may be seeking in the fall, exercises some of his options, buys fifty futures at $1 apiece, and sells these futures to the first Ohio State fan. The Ohio State University does the same with a second Ohio State fan, and both the player and The Ohio State University realize an $850 profit (fifty futures times $20 per future less a $100 premium for option and the fifty $1 strike prices per future) and exit the market. Note that the $850 profit, as well as all profits discussed in this example, do not take into consideration the transaction fees (i.e., those fees charged by the exchange to complete the trading transaction).

The first Ohio State fan searches the market for other investors who believe the market for SYM$_{OHIOSTATE}$ futures has not reached the top. If the first Ohio State fan finds yet another Ohio State fan or an Ohio State speculator willing to pay more than $20 per future (perhaps because the price of Michigan futures and Penn State futures has increased to $25 each), then the first Ohio State fan sells his or her futures and exits the market, making a profit commensurate with the difference between what he or she was able to sell for and what he paid.

The first Ohio State fan also can hedge the risk of holding those futures by trading index futures on a companion market. For example, the same day the first Ohio State fan purchased the futures, the aggregate mean price per future (i.e., the aggregate price of all of the participating institutions) is trading at $15 per future. Given that the first Ohio State fan knows that he paid $20 per future, the first Ohio State fan speculates that the aggregate mean index future price will increase and hedges his purchase of Ohio State futures by buying 200 index futures at $15 per future.

On the subsequent NLI signing day, the prospect sees that SYM$_{OHIOSTATE}$ futures are trading at $20 while Michigan futures are trading only at $18 and the prospect, after weighing the respective futures prices, the academic programs, the coaching staff, the traditions, the athletic opportunities and other factors, chooses Ohio State. In addition, the aggregate mean index future price settles at $20 with a price per future payout of $5 per future for traders who speculated that futures would settle above $15 per future. The first Ohio State fan is satisfied: He has helped secure the prospect for Ohio State. In addition, the first Ohio State fan's gain on his index future trade (200 index futures×$5=$1000) offsets a potential $1000 loss on his purchase of 50 SYM$_{OHIOSTATE}$ futures at $20 per future in the primary market.

The final report card of the results of all these transactions is as follows: (a) The Ohio State University realizes $850; (b) the player realizes $850; (c) the prospect chooses Ohio State in part because the fans have demonstrated that they will support the non-rival Ohio State athletic program he will soon join; (d) the first Ohio State fan breaks even economically, but realizes the gain of Ohio State signing the prospect to an NLI Commitment. Lastly, the exchange collects transaction fees on the trades in the primary market and companion market of The Ohio State University, the player, the first Ohio State fan, the second Ohio State Fan and distributes a percentage of the transaction fees to the general scholarship funds of all institution's sponsoring non-rival athletic programs that are traded on the exchange.

The above example highlights one of the trading scenarios possible with the system and method of the present invention. As will be appreciated by those skilled in the art, other examples, using one or more of the exchange variations discussed above are also possible and fall within the scope of the present invention. Accordingly, while certain representative embodiments and details have been shown for purposes of illustrating the invention, it will be apparent to those skilled in the art that various changes may be made without departing from the scope of the invention, which is defined in the appended claims.

We claim:

1. An apparatus for trading an educational institution athletic derivative contract where an underlying commercial relationship corresponding to said derivative contract is a mutually-agreed upon obligation between a particular educational institution and at least one student-athlete such that said at least one student-athlete participates in at least one intercollegiate sport offered by said particular educational institution in return for said particular educational institution providing at least a portion of the cost of said at least one student-athlete to attend said particular educational institution, said apparatus comprising:

a data output configured to convey trading information relating to said derivative contract to a first trader;
   a data input configured to receive trading instructions related to said derivative contract from said first trader;
   a communications link configured to electronically connect at least one of said data input and said data output with a trading exchange; and
   a computer readable medium cooperative with said data input, said data output and the trading exchange such that upon attainment of said obligation between said particular educational institution and said at least one student-athlete, trading on said derivative contract that corresponds to said obligation can commence, further such that upon placement from said first trader of an offer to sell or a bid to buy said derivative contract through said data input, said apparatus processes said bid or said offer in order to establish a trade between said first trader and a second trader with a complementary bid to buy or offer to sell said derivative contract.

2. The apparatus of claim 1, wherein said computer readable medium is selected from the group consisting of hard disk drive, CD, DVD, propagated signal transmitted over said communications link, floppy disk and flash memory.

3. The apparatus of claim 1, wherein said computer readable medium is resident with at least one of said data input, said data output and the trading exchange.

4. The apparatus of claim 1, wherein said trading information is arranged in a database comprising:

identification of at least one college athletic program that is available for trading through said apparatus;
   current trading price of said derivative contract corresponding to said identified program; and
   current number of said derivative contracts corresponding to said identified program that are available for trading.

5. The apparatus of claim 1, wherein at least one of said data input and said data output comprises a graphical user interface.

6. The apparatus of claim 1, wherein said data input and data output comprises a client terminal configured to send, receive said trading information.

7. An apparatus for trading a non-rival college athletic derivative contract where an underlying commercial relationship corresponding to said non-rival college athletic derivative contract is a mutually-agreed upon obligation between a particular educational institution and at least one student-athlete such that said at least one student-athlete participates in at least one intercollegiate sport offered by said particular educational institution in return for said particular educational institution providing at least a portion of the cost of said at least one student-athlete to attend said particular educational institution, said apparatus comprising:

a central trading platform through which trading orders of said non-rival college athletic derivative contract are executed;

a database comprising a collection of available athletic programs from which a trader may choose to trade, each of said athletic programs within said database comprising unique identification indicia pertaining to said non-rival college athletic derivative contract, said database cooperative with said trading platform such that information contained in said database can be retrieved and operated on by said trading platform;

means for exchanging order information pertaining to said non-rival college athletic derivative contract;

means for executing a trade of said non-rival college athletic derivative contract; and means for informing traders of a fill status of said non-rival college athletic derivative contract.

8. The apparatus of claim 7, wherein said central trading platform comprises an electronic trading platform comprising:

at least one processing unit;

at least one memory storage device configured to exchange data with said at least one processing unit; and an input interface for receiving data associated with said non-rival college athletics derivative contract selected from said database, wherein said means for exchanging order information, said means for executing a trade and said means for informing traders comprise program means cooperative with said electronic trading platform and configured to provide instruction to said processing unit to match a trader buy order with a trader sell order associated with said non-rival college athletics derivative contract selected from said database.

9. The apparatus of claim 8, wherein said program means is operative to enable a transaction including a listing, purchase, sale or trade of said non-rival college athletics derivative contract.

10. The apparatus of claim 8, wherein said program means further provides for at least one of settling and clearing of said matched trade.

11. The apparatus of claim 7, wherein said mutually-agreed upon obligation comprises a National Letter of Intent between said at least one athlete and one said educational institution.

12. The apparatus of claim 7, wherein said unique identification indicia of each of said athletic programs further comprises at least one of current trading price and available quantity of said non-rival athletic derivative contracts.

13. The apparatus of claim 7, wherein said apparatus is configured as a college athletic futures contract exchange.

14. An article of manufacture comprising a computer usable medium having computer readable program code embodied therein for executing a trade of at least one college athletic futures contract where an underlying commercial relationship corresponding to said futures contract is a mutually-agreed upon obligation between a particular educational institution and at least one student-athlete such that said at least one student-athlete participates in at least one intercollegiate sport offered by said particular educational institution in return for said particular educational institution providing at least a portion of the cost of said at least one student-athlete to attend said particular educational institution, said computer readable program code in said article of manufacture comprising:

computer readable program code portion for causing a computer to accept at least one bid from a buyer of said at least one college athletic futures contract;

computer readable program code for causing said computer to accept at least one offer from a seller of said at least one college athletic futures contract;

computer readable program code portion for causing said computer to match said bid and said offer, thereby effecting said trade of at least one college athletic futures contract; and computer readable program code portion for causing said computer to notify said buyer and said seller that said trade of said at least one college athletic futures contract has been executed.

15. The article of manufacture of claim 14, wherein said computer readable program code further comprises computer readable program code portion for allocating to a trading account of at least one of said buyer and said seller an appropriate credit or debit once said trade has been executed.

16. The article of manufacture of claim 14, wherein said computer readable program code in said article of manufacture further comprises computer readable program code portion for placing a trade order for said at least one college athletic futures contract on an electronic exchange configured to facilitate said trade.

17. The article of manufacture of claim 14, wherein said computer readable medium comprises a carrier wave signally coupled to a seller of said at least one college athletic futures contract and a buyer of said at least one college athletic futures contract.

18. The article of manufacture of claim 14, further comprising computer readable program code portion comprising a collection of available athletic programs from which at least one of said buyer and said seller may choose, each of said athletic programs comprising unique identification indicia pertaining to said at least one college athletic futures contract.

19. The article of manufacture of claim 14, wherein said computer readable program code is configured to access a database that includes contractual obligations between at least one educational institution that participates in trading college athletic futures contracts and a plurality of athletes attending said at least one educational institution.

* * * * *